US011319064B1

(12) United States Patent
Wittmaak, Jr. et al.

(10) Patent No.: US 11,319,064 B1
(45) Date of Patent: May 3, 2022

(54) AUTONOMOUS PAYLOAD DEPLOYMENT AIRCRAFT

(71) Applicant: Textron Innovations Inc., Providence, RI (US)

(72) Inventors: John Robert Wittmaak, Jr., Newark, TX (US); Joshua Allan Edler, Bedford, TX (US); Eric Christopher Terry, Fort Worth, TX (US); Joseph Daniel Leachman, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/089,048

(22) Filed: Nov. 4, 2020

(51) Int. Cl.
*B64C 29/02* (2006.01)
*B64C 39/08* (2006.01)
(Continued)

(52) U.S. Cl.
CPC ............ *B64C 29/02* (2013.01); *B64C 1/1415* (2013.01); *B64C 3/32* (2013.01); *B64C 39/08* (2013.01);
(Continued)

(58) Field of Classification Search
CPC ......... B64C 29/02; B64C 1/1415; B64C 3/32; B64C 39/08; B64D 1/10; B64D 1/12; B64D 9/003; G05D 1/101
See application file for complete search history.

(56) References Cited

U.S. PATENT DOCUMENTS

| 1,655,113 A | 1/1928 | Nikola |
| 2,601,090 A | 6/1952 | James |

(Continued)

FOREIGN PATENT DOCUMENTS

| CN | 105539833 A | 5/2016 |
| FR | 2977865 A3 | 1/2013 |

(Continued)

OTHER PUBLICATIONS

Air Launched Unmanned Disaster Relief Delivery Vehicle, 33rd Annual AHS Student Design Competition, University of Maryland, Undated but admitted prior art.

(Continued)

*Primary Examiner* — Valentina Xavier
(74) *Attorney, Agent, or Firm* — Lawrence Youst PLLC

(57) ABSTRACT

An aircraft operable to transition between thrust-borne lift in a VTOL orientation and wing-borne lift in a biplane orientation. The aircraft has an airframe including first and second wings with first and second pylons coupled therebetween. A distributed thrust array is coupled to the airframe including a plurality of propulsion assemblies coupled to the first wing and a plurality of propulsion assemblies coupled to the second wing. A cargo pod is coupled between the first and second pylons. The cargo pod is rotatable between a loading configuration, substantially perpendicular to the wings and a transportation and deployment configuration, substantially parallel to the wings. A flight control system is configured to independently control each of the propulsion assemblies and to autonomously deploy a payload from the cargo pod at a desired location.

20 Claims, 19 Drawing Sheets

(51) Int. Cl.
  *B64C 3/32* (2006.01)
  *G05D 1/10* (2006.01)
  *B64C 1/14* (2006.01)
  *B64D 9/00* (2006.01)
  *B64D 1/12* (2006.01)
  *B64D 1/10* (2006.01)

(52) U.S. Cl.
  CPC ............... *B64D 1/10* (2013.01); *B64D 1/12* (2013.01); *B64D 9/003* (2013.01); *G05D 1/101* (2013.01)

(56) References Cited

U.S. PATENT DOCUMENTS

| | | | |
|---|---|---|---|
| 2,655,997 | A | 10/1953 | Peterson |
| 2,688,843 | A | 9/1954 | Pitt |
| 2,759,691 | A * | 8/1956 | Weaver ............... B64C 1/1415 244/118.3 |
| 3,002,712 | A | 10/1961 | Sterling |
| 3,081,964 | A | 3/1963 | Quenzler |
| 3,181,810 | A | 5/1965 | Olson |
| 3,259,343 | A | 7/1966 | Roppel |
| 3,289,980 | A | 12/1966 | Gardner |
| 3,350,035 | A | 10/1967 | Schlieben |
| 3,371,891 | A * | 3/1968 | Brader, Sr. ............... B64D 1/02 244/137.3 |
| 3,592,412 | A | 7/1971 | Glatfelter |
| 3,618,875 | A | 11/1971 | Kappus |
| 3,783,618 | A | 1/1974 | Kawamura |
| 3,916,588 | A | 11/1975 | Magill |
| 4,243,358 | A | 1/1981 | Carlock et al. |
| 4,458,864 | A | 7/1984 | Colombo et al. |
| 4,571,157 | A | 2/1986 | Eickmann |
| 4,596,368 | A | 6/1986 | Schmittle |
| 4,613,098 | A | 9/1986 | Eickmann |
| 4,741,672 | A | 5/1988 | Breuner |
| 4,771,967 | A | 9/1988 | Geldbaugh |
| 4,913,377 | A | 4/1990 | Eickmann |
| 4,925,131 | A | 5/1990 | Eickmann |
| 5,131,605 | A | 7/1992 | Kress |
| 5,188,512 | A | 2/1993 | Thornton |
| 5,592,894 | A | 1/1997 | Johnson |
| 5,842,667 | A | 12/1998 | Jones |
| 6,086,015 | A | 7/2000 | MacCready |
| 6,170,778 | B1 | 1/2001 | Cycon et al. |
| 6,260,793 | B1 | 7/2001 | Balayn et al. |
| 6,270,038 | B1 | 8/2001 | Cycon et al. |
| 6,402,088 | B1 | 6/2002 | Syrovy et al. |
| 6,655,631 | B2 | 12/2003 | Austen-Brown |
| 6,845,939 | B1 | 1/2005 | Baldwin |
| 6,886,776 | B2 | 5/2005 | Wagner et al. |
| 6,892,980 | B2 | 5/2005 | Kawai |
| 7,059,562 | B2 | 6/2006 | Baldwin |
| 7,150,429 | B2 | 12/2006 | Kusic |
| 7,210,654 | B1 | 5/2007 | Cox et al. |
| 7,465,236 | B2 | 12/2008 | Wagels |
| 7,472,863 | B2 | 1/2009 | Pak |
| 7,555,893 | B2 | 7/2009 | Okai et al. |
| 7,984,684 | B2 | 7/2011 | Hinderks |
| 8,152,096 | B2 | 4/2012 | Smith |
| 8,393,564 | B2 | 3/2013 | Kroo |
| 8,505,846 | B1 | 8/2013 | Sanders |
| 8,602,348 | B2 | 12/2013 | Bryant |
| 8,646,720 | B2 | 2/2014 | Shaw |
| 8,733,690 | B2 | 5/2014 | Bevirt et al. |
| 8,800,912 | B2 | 8/2014 | Oliver |
| 8,820,672 | B2 | 9/2014 | Erben et al. |
| 8,833,692 | B2 | 9/2014 | Yoeli |
| 8,909,391 | B1 | 12/2014 | Peeters et al. |
| 8,948,935 | B1 | 2/2015 | Peeters et al. |
| 9,022,312 | B2 | 5/2015 | Kosheleff |
| 9,045,226 | B2 | 6/2015 | Piasecki et al. |
| 9,087,451 | B1 | 7/2015 | Jarrell |
| 9,108,744 | B2 | 8/2015 | Takeuchi |
| 9,109,575 | B2 | 8/2015 | Weddendorf et al. |
| 9,120,560 | B1 | 9/2015 | Armer et al. |
| 9,127,908 | B2 | 9/2015 | Miralles |
| 9,162,753 | B1 | 10/2015 | Panto et al. |
| 9,187,174 | B2 | 11/2015 | Shaw |
| 9,193,460 | B2 | 11/2015 | Laudrain |
| 9,221,538 | B2 | 12/2015 | Takahashi et al. |
| 9,242,714 | B2 | 1/2016 | Wang et al. |
| 9,254,916 | B2 | 2/2016 | Yang |
| 9,284,049 | B1 | 3/2016 | Wang et al. |
| 9,321,530 | B2 | 4/2016 | Wang et al. |
| 9,376,208 | B1 | 6/2016 | Gentry |
| 9,388,794 | B2 | 7/2016 | Weddendorf et al. |
| 9,403,593 | B2 | 8/2016 | Downey et al. |
| 9,440,736 | B2 | 9/2016 | Bitar |
| 9,463,875 | B2 | 10/2016 | Abuelsaad et al. |
| 9,493,225 | B2 | 11/2016 | Wang et al. |
| 9,610,817 | B1 | 4/2017 | Piasecki et al. |
| 9,643,720 | B2 | 5/2017 | Hesselbarth |
| 9,694,908 | B2 | 7/2017 | Razroev |
| 9,694,911 | B2 | 7/2017 | Bevirt et al. |
| 9,714,087 | B2 | 7/2017 | Matsuda |
| 9,798,322 | B2 | 10/2017 | Bachrach et al. |
| 9,800,091 | B2 | 10/2017 | Nugent, Jr. et al. |
| 9,821,909 | B2 | 11/2017 | Moshe |
| 9,963,228 | B2 | 5/2018 | McCullough et al. |
| 9,994,313 | B2 | 6/2018 | Claridge et al. |
| 10,011,351 | B2 | 7/2018 | McCullough et al. |
| 10,086,931 | B2 * | 10/2018 | Reichert ............ B64C 29/0025 |
| 10,124,890 | B2 | 11/2018 | Sada-Salinas et al. |
| 10,183,746 | B2 | 1/2019 | McCullough et al. |
| 10,214,285 | B2 * | 2/2019 | McCullough ............ B64C 29/02 |
| 10,220,944 | B2 | 3/2019 | McCullough et al. |
| 10,227,133 | B2 | 3/2019 | McCullough et al. |
| 10,232,950 | B2 * | 3/2019 | McCullough ............ B64C 39/02 |
| 10,266,266 | B2 | 4/2019 | Sopper et al. |
| 10,301,016 | B1 * | 5/2019 | Bondarev ............ B64C 29/0033 |
| 10,322,799 | B2 | 6/2019 | McCullough et al. |
| 10,597,164 | B2 * | 3/2020 | Oldroyd ............... G05D 1/0072 |
| 10,650,342 | B2 | 5/2020 | Shucker et al. |
| 10,661,892 | B2 * | 5/2020 | McCullough ............ B64C 25/36 |
| 10,870,485 | B2 * | 12/2020 | Reichert ............... B64D 27/24 |
| 10,946,982 | B2 | 3/2021 | Carthew et al. |
| 11,111,010 | B2 * | 9/2021 | Bernard ............... B64C 39/024 |
| 2002/0100834 | A1 | 8/2002 | Baldwin |
| 2002/0100835 | A1 | 8/2002 | Kusic |
| 2003/0062443 | A1 | 4/2003 | Wagner et al. |
| 2004/0245374 | A1 | 12/2004 | Morgan |
| 2006/0091258 | A1 | 5/2006 | Chiu et al. |
| 2006/0266881 | A1 | 11/2006 | Hughey |
| 2007/0212224 | A1 | 9/2007 | Podgurski |
| 2007/0221780 | A1 | 9/2007 | Builta |
| 2009/0008499 | A1 | 1/2009 | Shaw |
| 2010/0147993 | A1 | 6/2010 | Annati et al. |
| 2010/0193644 | A1 | 8/2010 | Karem |
| 2010/0295321 | A1 | 11/2010 | Bevirt |
| 2011/0001001 | A1 | 1/2011 | Bryant |
| 2011/0042508 | A1 | 2/2011 | Bevirt |
| 2011/0042509 | A1 | 2/2011 | Bevirt et al. |
| 2011/0057453 | A1 | 3/2011 | Roberts |
| 2011/0121570 | A1 | 5/2011 | Bevirt et al. |
| 2011/0315806 | A1 | 12/2011 | Piasecki et al. |
| 2012/0209456 | A1 | 8/2012 | Harmon et al. |
| 2012/0234968 | A1 | 9/2012 | Smith |
| 2013/0020429 | A1 | 1/2013 | Kroo |
| 2013/0175404 | A1 | 7/2013 | Shefer |
| 2013/0341458 | A1 | 12/2013 | Sutton et al. |
| 2014/0018979 | A1 | 1/2014 | Goossen et al. |
| 2014/0097290 | A1 | 4/2014 | Leng |
| 2014/0339372 | A1 | 11/2014 | Dekel et al. |
| 2015/0012154 | A1 | 1/2015 | Senkel et al. |
| 2015/0014475 | A1 | 1/2015 | Taylor et al. |
| 2015/0136897 | A1 | 5/2015 | Seibel et al. |
| 2015/0284079 | A1 | 10/2015 | Matsuda |
| 2015/0285165 | A1 | 10/2015 | Steinwandel et al. |
| 2016/0068265 | A1 | 3/2016 | Hoareau et al. |
| 2016/0180717 | A1 | 6/2016 | Ubhi et al. |
| 2016/0214712 | A1 | 7/2016 | Fisher et al. |
| 2017/0008627 | A1 | 1/2017 | Soto et al. |

(56) References Cited

U.S. PATENT DOCUMENTS

| | | |
|---|---|---|
| 2017/0021924 A1 | 1/2017 | Kubik et al. |
| 2017/0066531 A1 | 3/2017 | McAdoo |
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0203843 A1* | 7/2017 | Chan .................... B64C 39/024 |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002011 A1* | 1/2018 | McCullough ......... B64C 39/024 |
| 2018/0002012 A1 | 1/2018 | McCullough et al. |
| 2018/0002013 A1 | 1/2018 | McCullough et al. |
| 2018/0002014 A1 | 1/2018 | McCullough et al. |
| 2018/0002015 A1 | 1/2018 | McCullough et al. |
| 2018/0002016 A1 | 1/2018 | McCullough et al. |
| 2018/0002026 A1* | 1/2018 | Oldroyd .............. B64C 29/0033 |
| 2018/0002027 A1 | 1/2018 | McCullough et al. |
| 2018/0022467 A1 | 1/2018 | Alber |
| 2018/0044011 A1 | 2/2018 | Reichert |
| 2018/0244377 A1 | 8/2018 | Chan |
| 2018/0244383 A1 | 8/2018 | Valente et al. |
| 2018/0257761 A1 | 9/2018 | Oldroyd et al. |
| 2018/0265193 A1 | 9/2018 | Gibboney et al. |
| 2018/0273160 A1 | 9/2018 | Baldwin et al. |
| 2018/0281943 A1* | 10/2018 | McCullough ........... B64C 11/28 |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1 | 5/2019 | McCullough et al. |
| 2019/0263516 A1 | 8/2019 | McCullough et al. |
| 2019/0389573 A1 | 12/2019 | Kahou et al. |

FOREIGN PATENT DOCUMENTS

| | | |
|---|---|---|
| GB | 587388 A | 4/1947 |
| GB | 618475 A | 2/1949 |
| GB | 654089 A | 6/1951 |
| WO | 2001074659 A1 | 10/2001 |
| WO | 2005039973 A2 | 5/2005 |
| WO | 2014067563 A1 | 5/2014 |

OTHER PUBLICATIONS

Bell and NASA Partner for UAV Development; Transportup.com; Sep. 9, 2018.

Bell APT—Automatic Pod Transport; SUASNEWS.com; Dec. 6, 2017.

Bell Autonomous Pod Transport; MONCH.com; May 2, 2018.

Wolfe, Frank; Bell Moving to Scale Up Antonymous Delivery Drones for US Military; Rotor & Wing International; Sep. 27, 2018.

* cited by examiner

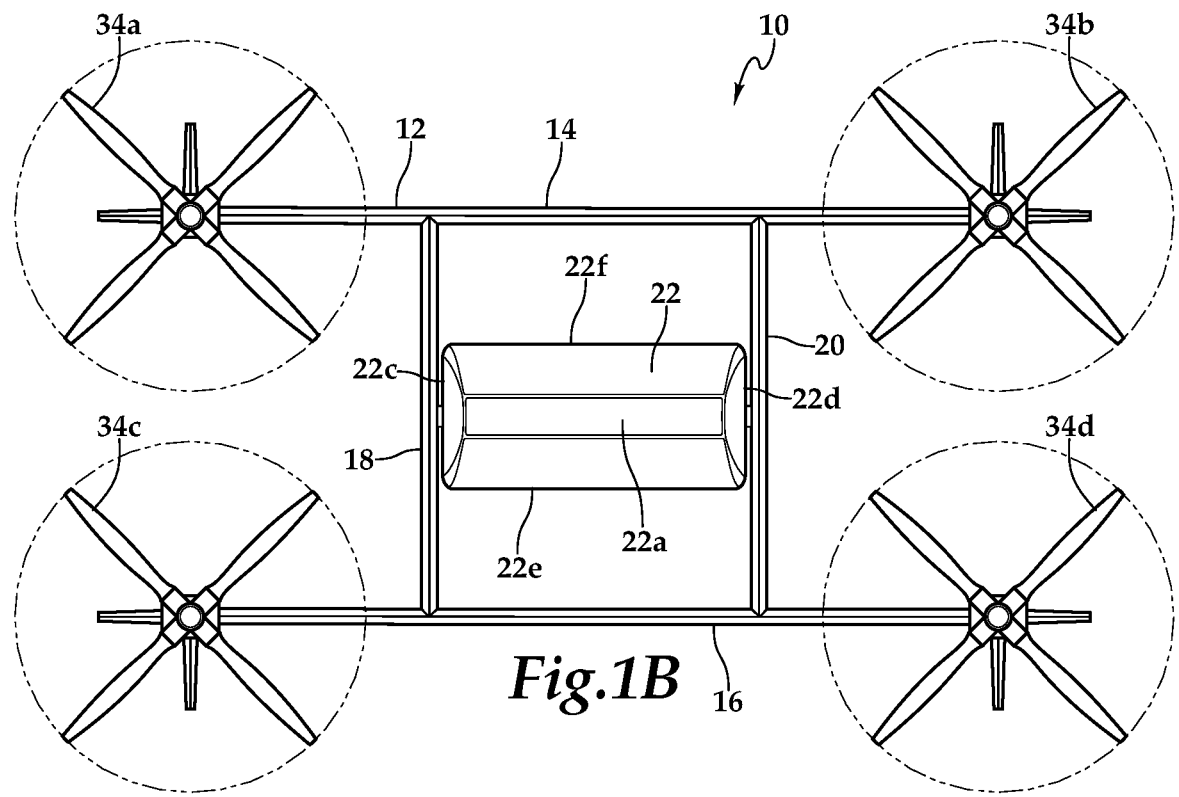
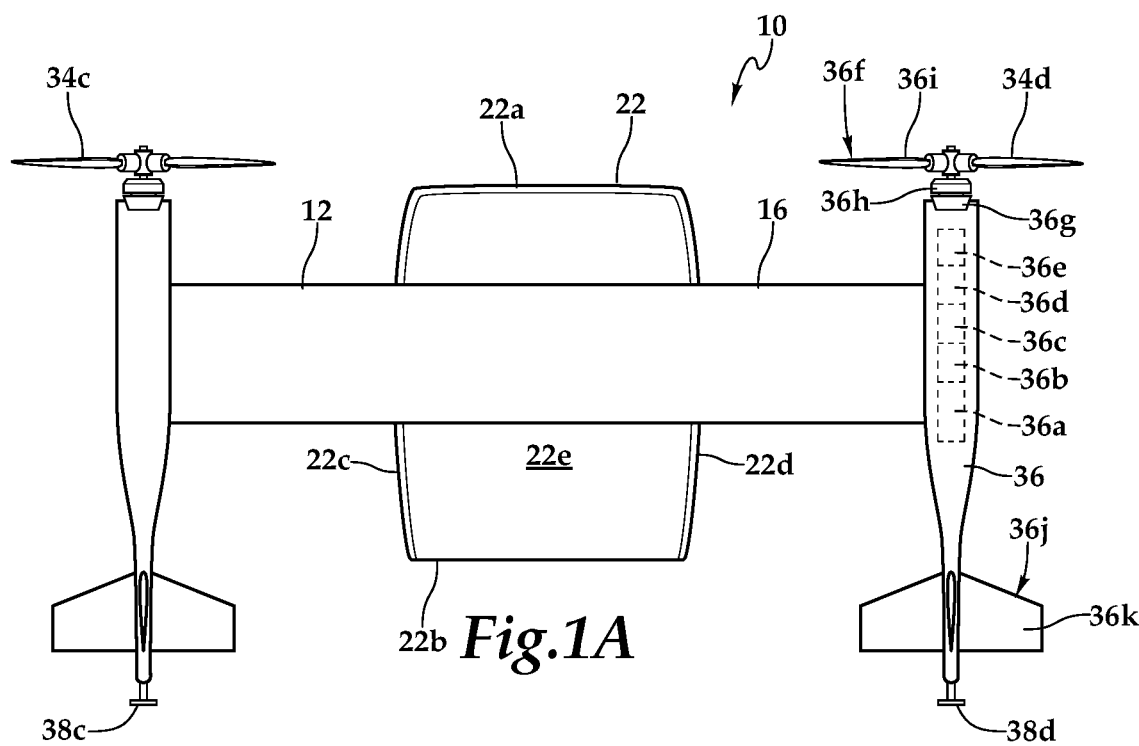

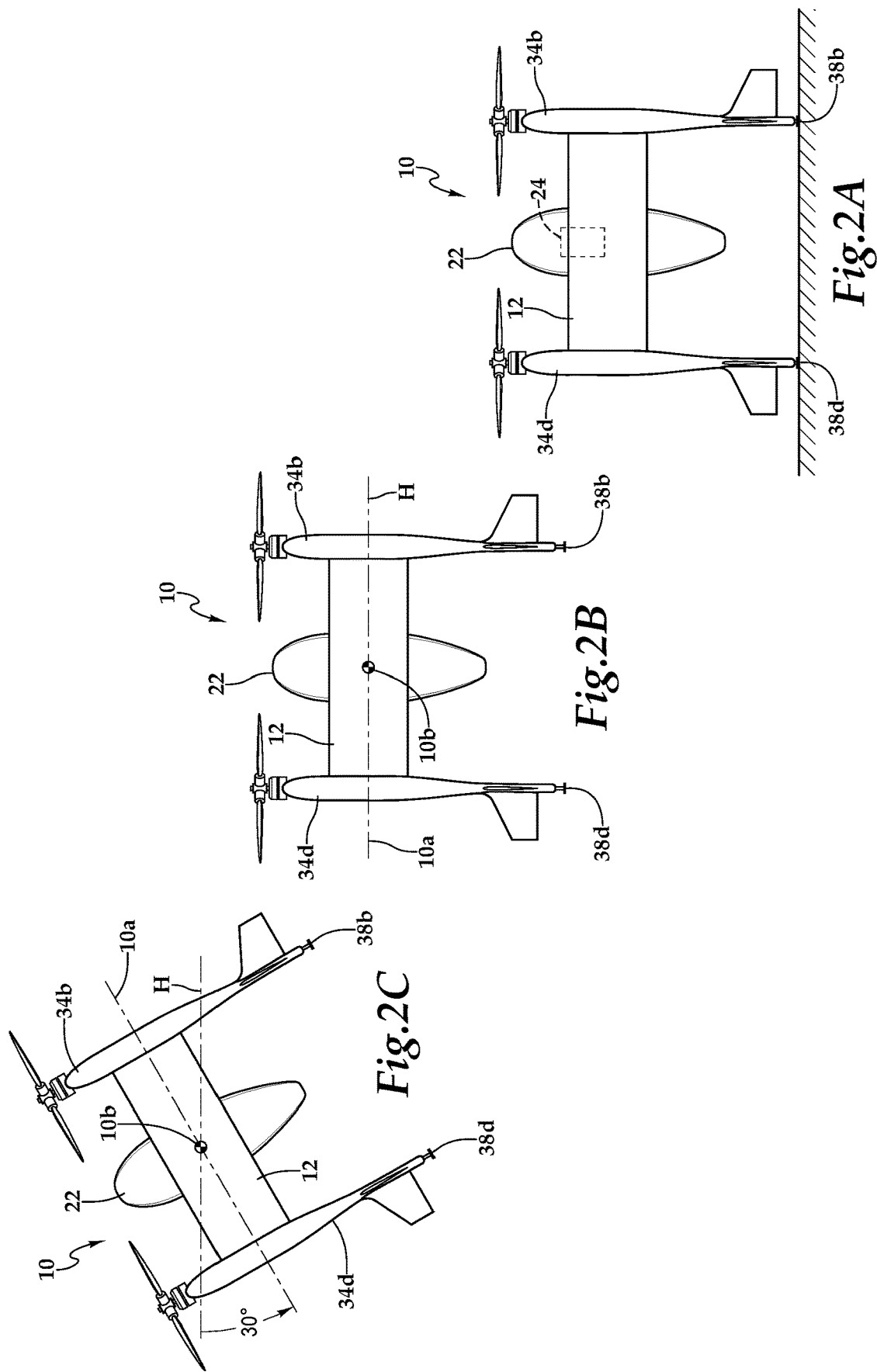

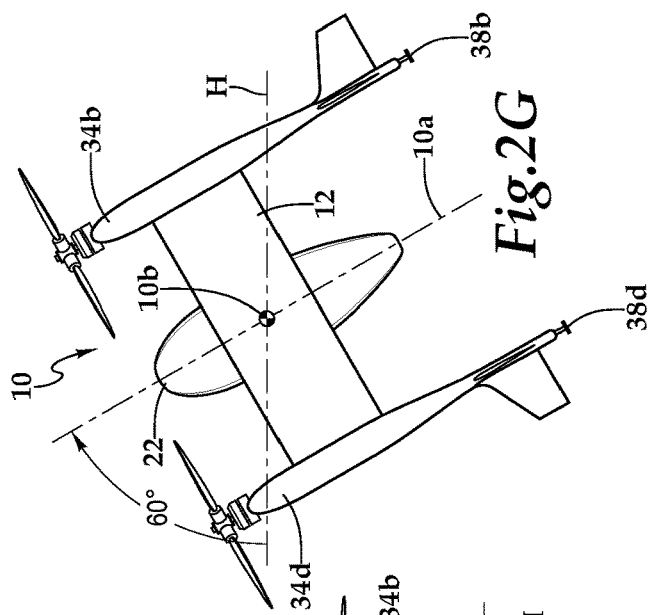
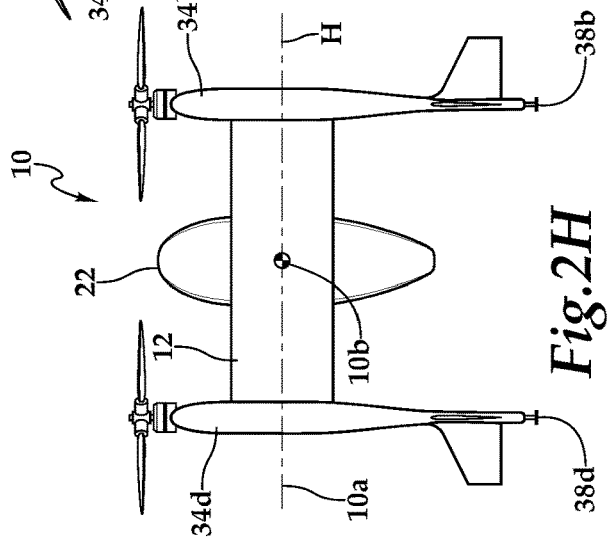
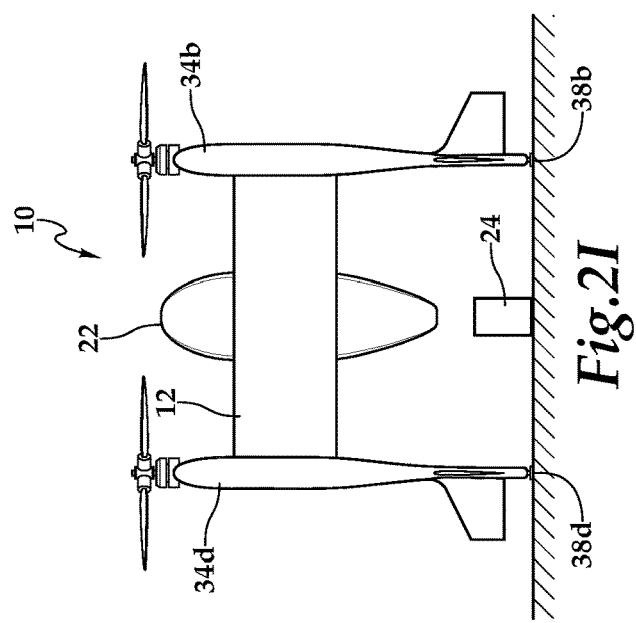

AUTONOMOUS PAYLOAD DEPLOYMENT AIRCRAFT

TECHNICAL FIELD OF THE DISCLOSURE

The present disclosure relates, in general, to aircraft configured to convert between thrust-borne lift in a VTOL orientation and wing-borne lift in a biplane orientation and, in particular, to aircraft configured to autonomously transport and deploy a payload to a desired location.

BACKGROUND

It is often desirable to deploy a payload such as food, water, medicine or other supplies to a remote, distant, dangerous or otherwise inaccessible location during military operations, disaster relief, humanitarian efforts or other missions. Fixed wing aircraft are capable of delivering a payload over a long range in a short time. It has been found, however, that a majority of the locations requiring such payload deployment lack suitable conditions for landing a fixed wing aircraft. To overcome this runway requirement, attempts have been made to use fixed wing aircraft in airdrop operations in which a payload is released during flight for drop to the ground with or without the aid of a parachute. It has been found, however, that high altitude airdrops require significant preplanning and lack suitable precision for certain payload deployments rendering such operations ineffective.

Helicopters are highly versatile for use in congested, isolated or remote areas where fixed wing aircraft may be unable to take off or land. In addition, helicopters are able to execute payload deployment operations in stationary flight over a desired location. For example, payload deployment may be accomplished using a hoist or winch assembly that is operable to raise and/or lower the payload while the helicopter remains in a stable hover. It has been found, however, that helicopters lack the desired speed and range necessary for certain payload deployment operations. In addition, particularly for smaller aircraft, it has been found that aircraft mounted hoist assemblies have a significant weight penalty. Further, both fixed wing aircraft and helicopters typically require a pilot that may be put in harm's way during some payload deployment operations. Accordingly, a need has arisen for improved aircraft and aircraft systems operable to autonomously transport and deploy a payload to a desired location.

SUMMARY

In a first aspect, the present disclosure is directed to an aircraft operable to transition between thrust-borne lift in a VTOL orientation and wing-borne lift in a biplane orientation. The aircraft has an airframe that includes first and second wings with first and second pylons coupled therebetween. A distributed thrust array is coupled to the airframe. The thrust array includes a plurality of propulsion assemblies coupled to the first wing and a plurality of propulsion assemblies coupled to the second wing. A cargo pod is coupled between the first and second pylons. The cargo pod is rotatable between a loading configuration substantially perpendicular to the wings and a transportation and deployment configuration substantially parallel to the wings. A flight control system is configured to independently control each of the propulsion assemblies and to autonomously deploy a payload from the cargo pod at a desired location. In the loading configuration, the cargo pod is adapted to receive the payload through a substantially horizontally oriented front opening. In the transportation and deployment configuration, the cargo pod is adapted to deploy the payload through a substantially horizontally oriented aft opening.

In certain embodiments, the cargo pod may have an aerodynamic outer shape. In some embodiments, the cargo pod may be a cargo enclosure having a front hatch operable to cover and uncover the front opening and an aft hatch operable to cover and uncover the aft opening. In certain embodiments, the cargo pod may be an open air cargo pod wherein the front opening and the aft opening remain uncovered. In some embodiments, the front opening and the aft opening may be substantially normal to one another. In certain embodiments, the front opening and the aft opening may intersect. In some embodiments, the cargo pod may include a payload support assembly that secures the payload in the cargo pod for transportation. For example, such a payload support assembly may include a lock system, a gate system and/or a variable payload cavity configurable based upon the size of the payload.

In certain embodiments, the cargo pod may include a payload deployment assembly configured to release the payload from the cargo pod responsive to the flight control system. For example, the payload deployment assembly may include a rail system, a cable system such as a retractable cable system or an expendable cable system, a payload self-orienting system and/or a gate system. In some embodiments, the flight control system may be configured to autonomously deploy the payload from the cargo pod at the desired location when the aircraft is positioned on a surface in a tailsitter orientation.

In a second aspect, the present disclosure is directed to an aircraft operable to transition between thrust-borne lift in a VTOL orientation and wing-borne lift in a biplane orientation. The aircraft has an airframe that includes first and second wings with first and second pylons coupled therebetween. A distributed thrust array is coupled to the airframe. The thrust array includes a plurality of propulsion assemblies coupled to the first wing and a plurality of propulsion assemblies coupled to the second wing. A cargo pod is coupled between the first and second pylons. The cargo pod is rotatable between a loading configuration substantially perpendicular to the wings and a transportation and deployment configuration substantially parallel to the wings. A flight control system is configured to independently control each of the propulsion assemblies and to autonomously deploy a payload from the cargo pod at a desired location. The cargo pod has a payload support assembly and a payload deployment assembly. The payload support assembly includes a lock system configured to the secure the payload in the cargo pod. The payload deployment assembly includes a cable system configured to release the payload from the cargo pod responsive to the flight control system.

In a third aspect, the present disclosure is directed to an aircraft operable to transition between thrust-borne lift in a VTOL orientation and wing-borne lift in a biplane orientation. The aircraft has an airframe that includes first and second wings with first and second pylons coupled therebetween. A distributed thrust array is coupled to the airframe. The thrust array includes a plurality of propulsion assemblies coupled to the first wing and a plurality of propulsion assemblies coupled to the second wing. A cargo pod is coupled between the first and second pylons. The cargo pod is rotatable between a loading configuration substantially perpendicular to the wings and a transportation and deployment configuration substantially parallel to the wings. A flight control system is configured to independently control each of the propulsion assemblies and to autonomously deploy a payload from the cargo pod at a desired location. The cargo pod has a payload support assembly and a payload deployment assembly. The payload support assembly includes a variable payload cavity configurable based upon the size of the payload and configured to the secure the payload in the cargo pod. The payload deployment assembly includes a gate system configured to release the payload from the cargo pod responsive to the flight control system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1F are schematic illustrations of a payload deployment aircraft operable to convert between thrust-borne lift in a VTOL orientation and wing-borne lift in a biplane orientation in accordance with embodiments of the present disclosure;

FIGS. 2A-2I are schematic illustrations of the payload deployment aircraft of FIG. 1 in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1D:
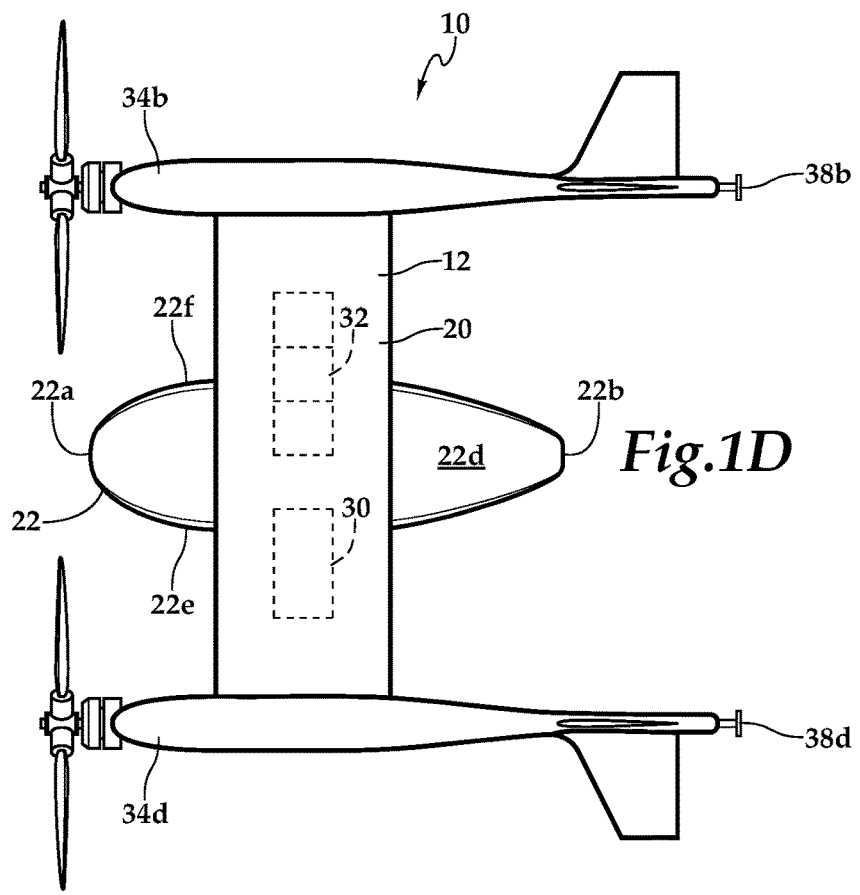
Figure 1C:
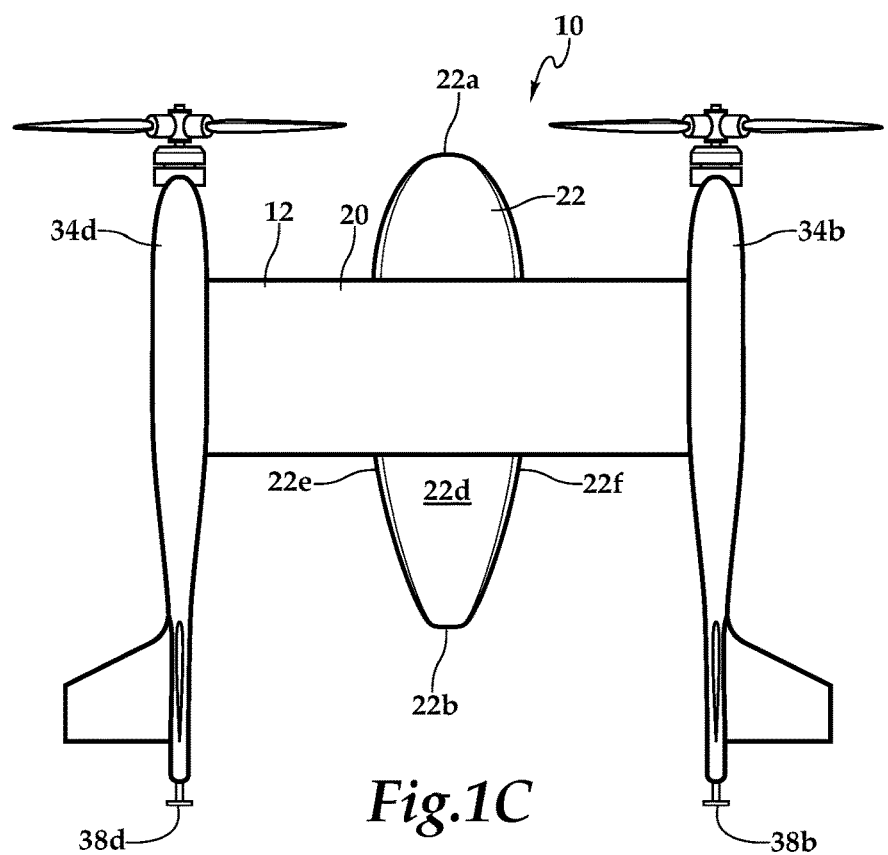
Figure 1F:
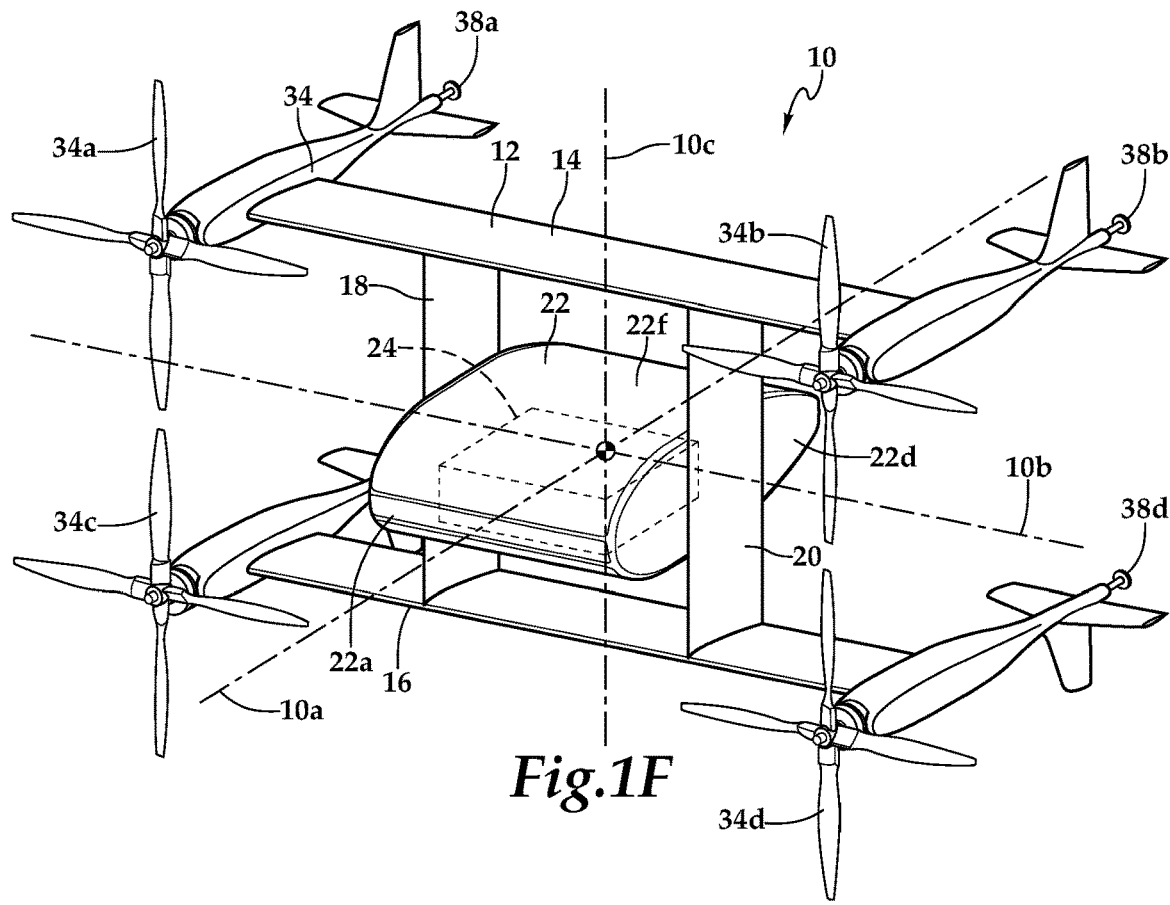
Figure 1E:
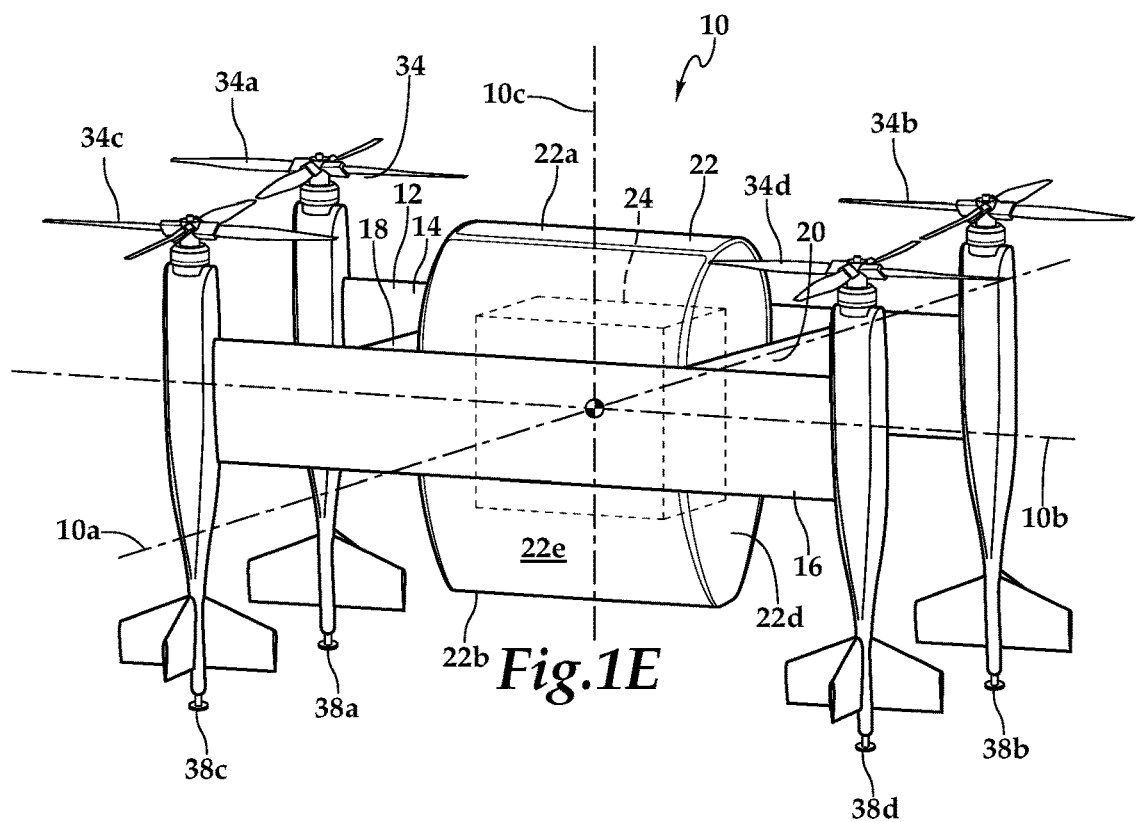

Referring to FIGS. 1A-1E in the drawings, various views of a payload deployment aircraft 10 operable to transition between thrust-borne lift in a VTOL orientation and wing-borne lift in a biplane orientation are depicted. FIGS. 1A, 1C and 1E depict aircraft 10 in the VTOL orientation wherein the propulsion assemblies provide thrust-borne lift. FIGS. 1B, 1D and 1F depict aircraft 10 in the biplane orientation wherein the propulsion assemblies provide forward thrust with the forward airspeed of aircraft 10 providing wing-borne lift enabling aircraft 10 to have a high speed and/or high endurance forward flight mode. Aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1E and 1F. When longitudinal axis 10a and lateral axis 10b are both in a horizontal plane and normal to the local vertical in the earth's reference frame, aircraft 10 has a level flight attitude.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. As best seen in FIG. 1B, in the biplane orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. In the illustrated embodiment, wings 14, 16 are substantially parallel with each other. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are substantially parallel with each other Aircraft 10 includes a cargo pod 22 that is coupled between pylons 18, 20. As discussed herein, cargo pod 22 is rotatable between a loading configuration in which cargo pod 22 is substantially perpendicular to wings 14, 16 and a transportation and deployment configuration in which cargo pod 22 is substantially parallel to wings 14, 16, as discussed herein. Cargo pod 22 has an aerodynamic shape with a forward end 22a and an aft end 22b with a cargo pod chord length extending therebetween, two sides 22c, 22d with a cargo pod span length extending therebetween and a front 22e and back 22f with a cargo pod thickness extending therebetween. The aerodynamic shape of cargo pod 22 is configured to minimize drag during high speed forward flight. Cargo pod 22 is preferably formed from high strength and lightweight materials such as fiberglass, carbon, plastic, metal or other suitable material or combination of materials. In the illustrated embodiment, cargo pod 22 is rotatably coupled to pylon 18 at side 22c and is rotatably coupled to pylon 20 at side 22d. As best seen in FIGS. 1E and 1F, cargo pod 22 is configured to receive, secure, transport and deploy a payload 24 that may be one or more payload items.

One or more of cargo pod 22, wings 14, 16 and/or pylons 18, 20 may contain flight control systems, energy sources, communication lines and other desired systems. For example, as best seen in FIG. 1D, pylon 20 houses the flight control system 30 of aircraft 10. Flight control system 30 is preferably a redundant digital flight control system including multiple independent flight control computers. For example, the use of a triply redundant flight control system 30 improves the overall safety and reliability of aircraft 10 in the event of a failure in flight control system 30. Flight control system 30 preferably includes non-transitory computer readable storage media including a set of computer instructions executable by one or more processors for controlling the operation of aircraft 10. Flight control system 30 may be implemented on one or more general-purpose computers, special purpose computers or other machines with memory and processing capability. For example, flight control system 30 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 30 may be a microprocessor-based system operable to execute program code in the form of machine-executable instructions. In addition, flight control system 30 may be selectively connectable to other computer systems via a proprietary encrypted network, a public encrypted network, the Internet or other suitable communication network that may include both wired and wireless connections.

One or more of cargo pod 22, wings 14, 16 and/or pylons 18, 20 may contain one or more of electrical power sources depicted as a plurality of batteries 32 in pylon 20, as best seen in FIG. 1D. Batteries 32 supplies electrical power to flight control system 30, the distributed thrust array of aircraft 10 and other power consumers of aircraft 10 such that aircraft 10 may be referred to as an electric vertical takeoff and landing (eVTOL) aircraft. In some embodiments, aircraft 10 may have a hybrid power system that includes one or more internal combustion engines and an electric generator. Preferably, the electric generator is used to charge batteries 32. In other embodiments, the electric generator may provide power directly to a power management system and/or the power consumers of aircraft 10. In still other embodiments, aircraft 10 may use fuel cells as the electrical power source.

Cargo pod 22, wings 14, 16 and/or pylons 18, 20 also contain a communication network that enables flight control system 30 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually denoted as 34a, 34b, 34c, 34d and collectively referred to as propulsion assemblies 34. In the illustrated embodiment, propulsion assemblies 34a, 34b are coupled at the wingtips of wing 14 and propulsion assemblies 34c, 34d are coupled at the wingtips of wing 16. By positioning propulsion assemblies 34a, 34b, 34c, 34d at the wingtip of wings 14, 16, the thrust and torque generating elements are positioned at the maximum outboard distance from the center of gravity of aircraft 10 located, for example, at the intersection of axes 10a, 10b, 10c. The outboard locations of propulsion assemblies 34 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 34 relative to other propulsion assemblies 34.

Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 34 in a wingtip mounted configuration, the distributed thrust array of aircraft 10 could have propulsion assemblies coupled to the wings in other configurations such as a mid-span configuration. Further, even though the illustrated embodiment depicts propulsion assemblies 34 in a mid-wing configuration, the distributed thrust array of aircraft 10 could have propulsion assemblies coupled to the wings in a low wing configuration, a high wing configuration or any combination or permutations thereof. In the illustrated embodiment, propulsion assemblies 34 are variable speed propulsion assemblies having fixed pitch rotor blades and thrust vectoring capability. Depending upon the implementation, propulsion assemblies 34 may have longitudinal thrust vectoring capability, lateral thrust vectoring capability or omnidirectional thrust vectoring capability. In other embodiments, propulsion assemblies 34 may be single speed propulsion assemblies, may have variable pitch rotor blades and/or may be non-thrust vectoring propulsion assemblies.

Propulsion assemblies 34 may be independently attachable to and detachable from airframe 12 and may be standardized and/or interchangeable units and preferably line replaceable units providing easy installation and removal from airframe 12. The use of line replaceable propulsion units is beneficial in maintenance situations if a fault is discovered with one of the propulsion assemblies. In this case, the faulty propulsion assembly 34 can be decoupled from airframe 12 by simple operations and another propulsion assembly 34 can then be attached to airframe 12. In other embodiments, propulsion assemblies 34 may be permanently coupled to wings 14, 16.

Referring to FIG. 1A, component parts of propulsion assembly 34d will now be described. It is noted that propulsion assembly 34d is representative of each propulsion assembly 34 therefore, for sake of efficiency, certain features have been disclosed only with reference to propulsion assembly 34d. One having ordinary skill in the art, however, will fully appreciate an understanding of each propulsion assembly 34 based upon the disclosure herein of propulsion assembly 34d. In the illustrated embodiment, propulsion assembly 34d includes a nacelle 36 that houses components including a battery 36a, an electronic speed controller 36b, one or more actuators 36c, an electronics node 34d, one or more sensors 36e and other desired electronic equipment. Nacelle 36 also supports a propulsion system 36f including a gimbal 36g, a variable speed electric motor 36h and a rotor assembly 36i. Extending from a lower end of nacelle 36 is a tail assembly 36j that includes one or more aerosurfaces 36k. In the illustrated embodiment, aerosurfaces 34k include stationary horizontal and vertical stabilizers. In other embodiments, aerosurfaces 34k may be active aerosurfaces that serve as elevators to control the pitch or angle of attack of wings 14, 16 and/or ailerons to control the roll or bank of aircraft 10 in the biplane orientation of aircraft 10. Aerosurfaces 34 also serve to enhance hover stability in the VTOL orientation of aircraft 10.

Flight control system 30 communicates via a wired communications network within airframe 12 with electronics nodes 36d of propulsion assemblies 34. Flight control system 30 receives sensor data from sensors 36e and sends flight command information to the electronics nodes 36d such that each propulsion assembly 34 may be individually and independently controlled and operated. For example, flight control system 30 is operable to individually and independently control the speed and the thrust vector of each propulsion system 36f. Flight control system 30 may autonomously control some or all aspects of flight operation for aircraft 10. Flight control system 30 is also operable to communicate with remote systems, such as a ground station via a wireless communications protocol. The remote system may be operable to receive flight data from and provide commands to flight control system 30 to enable remote flight control over some or all aspects of flight operation for aircraft 10. The autonomous and/or remote operation of aircraft 10 enables aircraft 10 to transport and deploy payload 24 to a desired location.

Aircraft 10 has a damping landing gear system that includes landing gear assembly 38a coupled to a lower or aft end of propulsion assembly 34a, landing gear assembly 38b coupled to a lower or aft end of propulsion assembly 34b, landing gear assembly 38c coupled to a lower or aft end of propulsion assembly 34c and landing gear assembly 38d coupled to a lower or aft end of propulsion assembly 34d. In the illustrated embodiment, each landing gear assembly 38 including a spring housing forming a spring chamber with a spring disposed therein and a plunger slidably coupled to the spring housing and movable between a compressed position and an extended position. The spring biases the plunger into the extended position during flight and the landing force compresses the plunger into the compressed position against the bias of the spring, thereby absorbing at least a portion of the landing force. In addition, the spring biasing force acting on the plunger when aircraft 10 is positioned on a landing surface generates a push-off effect to aid during takeoff maneuvers. In other embodiments, the landing gear assemblies may be passively operated pneumatic landing struts or actively operated telescoping landing struts. In still other embodiments, the landing gear assemblies may include wheels that enable aircraft 10 to taxi and perform other ground maneuvers. In such embodiments, the landing gear assemblies may provide a passive brake system or may include active brakes such as an electromechanical braking system or a manual braking system to facilitate parking during ground operations.

Figure 2D:
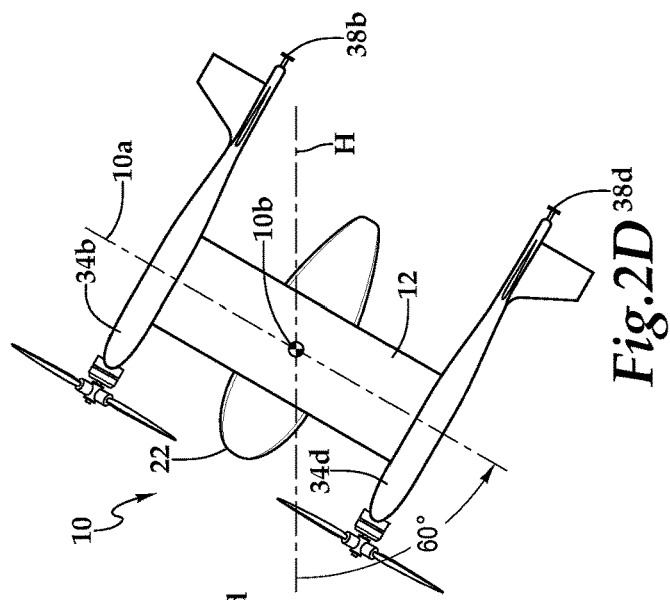

Referring additionally to FIGS. 2A-2I in the drawings, a sequential flight-operating scenario of aircraft 10 is depicted. As best seen in FIG. 2A, aircraft 10 is in a tailsitter position on a surface such as the ground or the deck of an aircraft carrier in which position, payload 24 may be received by cargo pod 22, as discussed herein. In this tailsitter position, the weight of aircraft 10 has caused the plungers of landing gear assemblies 38 to compress the springs disposed therein such that the plungers are in retracted positions. When aircraft 10 is ready for a payload deployment mission, flight control system 30 commences operations providing flight commands to the various components of aircraft 10. Flight control system 30 may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight.

As best seen in FIG. 2B, aircraft 10 has performed a vertical takeoff and is engaged in thrust-borne lift in the VTOL orientation of aircraft 10. As illustrated, the rotor assemblies of propulsion assemblies 34 are each rotating in the same horizontal plane. As longitudinal axis 10a and lateral axis 10b (denoted as the target) are both in a horizontal plane H that is normal to the local vertical in the earth's reference frame, aircraft 10 has a level flight attitude. In the VTOL orientation, the plungers of landing gear assemblies 38 have moved to their extending positions responsive to the biasing force applied by the springs disposed therein. In the VTOL orientation, wing 16 is the forward wing and wing 14 is the aft wing. As discussed herein, flight control system 30 independently controls and operates each propulsion assembly 34 including independently controlling speed and thrust vector. During hover, flight control system 30 may utilize differential speed control and/or differential or collective thrust vectoring of propulsion assemblies 34 to provide hover stability for aircraft 10 and to provide pitch, roll, yaw and translation authority for aircraft 10.

After vertical ascent to the desired elevation, aircraft 10 may begin the transition from thrust-borne lift to wing-borne lift. As best seen from the progression of FIGS. 2B-2E, aircraft 10 is operable to pitch down from the VTOL orientation toward the biplane orientation to enable high speed and/or long range forward flight. As seen in FIG. 2C, longitudinal axis 10*a* extends out of the horizontal plane H such that aircraft 10 has an inclined flight attitude of about thirty degrees pitch down. As seen in FIG. 2D, longitudinal axis 10*a* extends out of the horizontal plane H such that aircraft 10 has an inclined flight attitude of about sixty degrees pitch down. Flight control system 30 may achieve this operation through speed control of some or all of propulsion assemblies 34, thrust vectoring of some or all of propulsion assemblies 34 or any combination thereof.

Figure 2E:
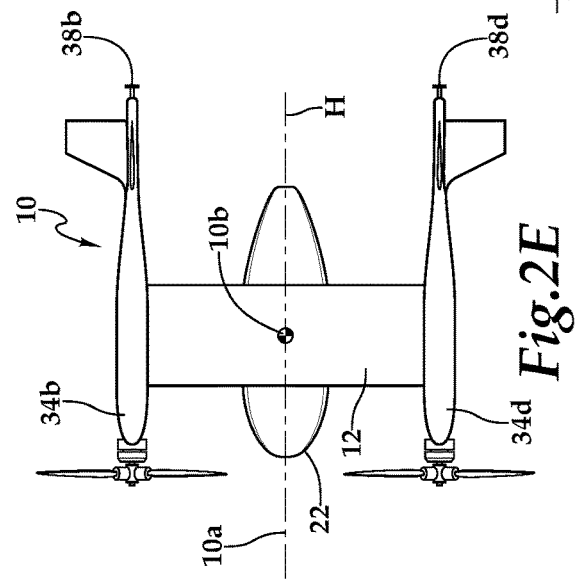

As best seen in FIG. 2E, aircraft 10 has completed the transition to the biplane orientation with the rotor assemblies of propulsion assemblies 34 each rotating in the same vertical plane. In the biplane orientation, wing 14 is the upper wing positioned above wing 16, which is the lower wing. By convention, longitudinal axis 10*a* has been reset to be in the horizontal plane H, which also includes lateral axis 10*b*, such that aircraft 10 has a level flight attitude in the biplane orientation. As forward flight with wing-borne lift requires significantly less power than VTOL flight with thrust-borne lift, the operating speed of some or all of the propulsion assemblies 34 may be reduced. In certain embodiments, some of the propulsion assemblies of aircraft 10 could be shut down during forward flight. In the biplane orientation, the independent control provided by flight control system 30 over each propulsion assembly 34 provides pitch, roll and yaw authority for aircraft 10.

Figure 2F:
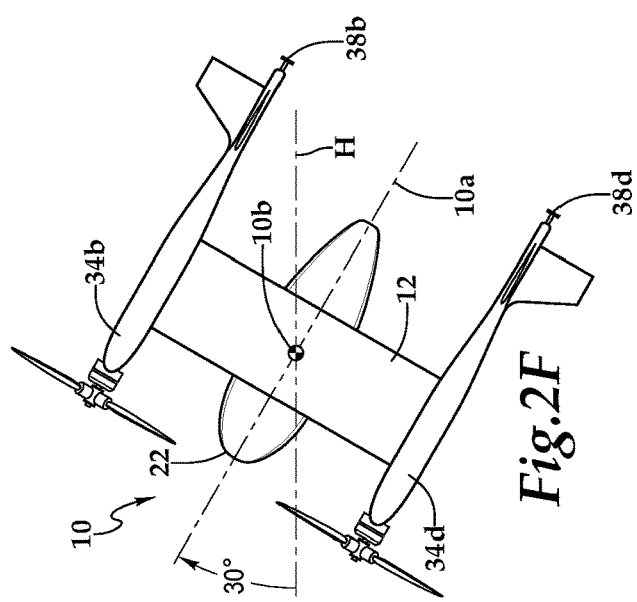

As aircraft 10 approaches the desired location, aircraft 10 may begin its transition from wing-borne lift to thrust-borne lift. As best seen from the progression of FIGS. 2E-2H, aircraft 10 is operable to pitch up from the biplane orientation to the VTOL orientation to enable, for example, a vertical landing operation. As seen in FIG. 2F, longitudinal axis 10*a* extends out of the horizontal plane H such that aircraft 10 has an inclined flight attitude of about thirty degrees pitch up. As seen in FIG. 2G, longitudinal axis 10*a* extends out of the horizontal plane H such that aircraft 10 has an inclined flight attitude of about sixty degrees pitch up. Flight control system 30 may achieve this operation through speed control of some or all of propulsion assemblies 34, thrust vectoring of some or all of propulsion assemblies 34 or any combination thereof. In FIG. 2H, aircraft 10 has completed the transition from the biplane orientation to the VTOL orientation and, by convention, longitudinal axis 10*a* has been reset to be in the horizontal plane H which also includes lateral axis 10*b* such that aircraft 10 has a level flight attitude in the VTOL orientation. Once aircraft 10 has completed the transition to the VTOL orientation, aircraft 10 may commence its vertical descent to a surface. As aircraft 10 is landing, the weight of aircraft 10 causes the plungers of landing gear assemblies 38 to compress the springs disposed therein such that the plungers are in retracted positions, thereby providing damping of the landing impact. As best seen in FIG. 2I, aircraft 10 has landed in a tailsitter orientation and has autonomously deployed payload 24 at the desired location.

Figure 3:
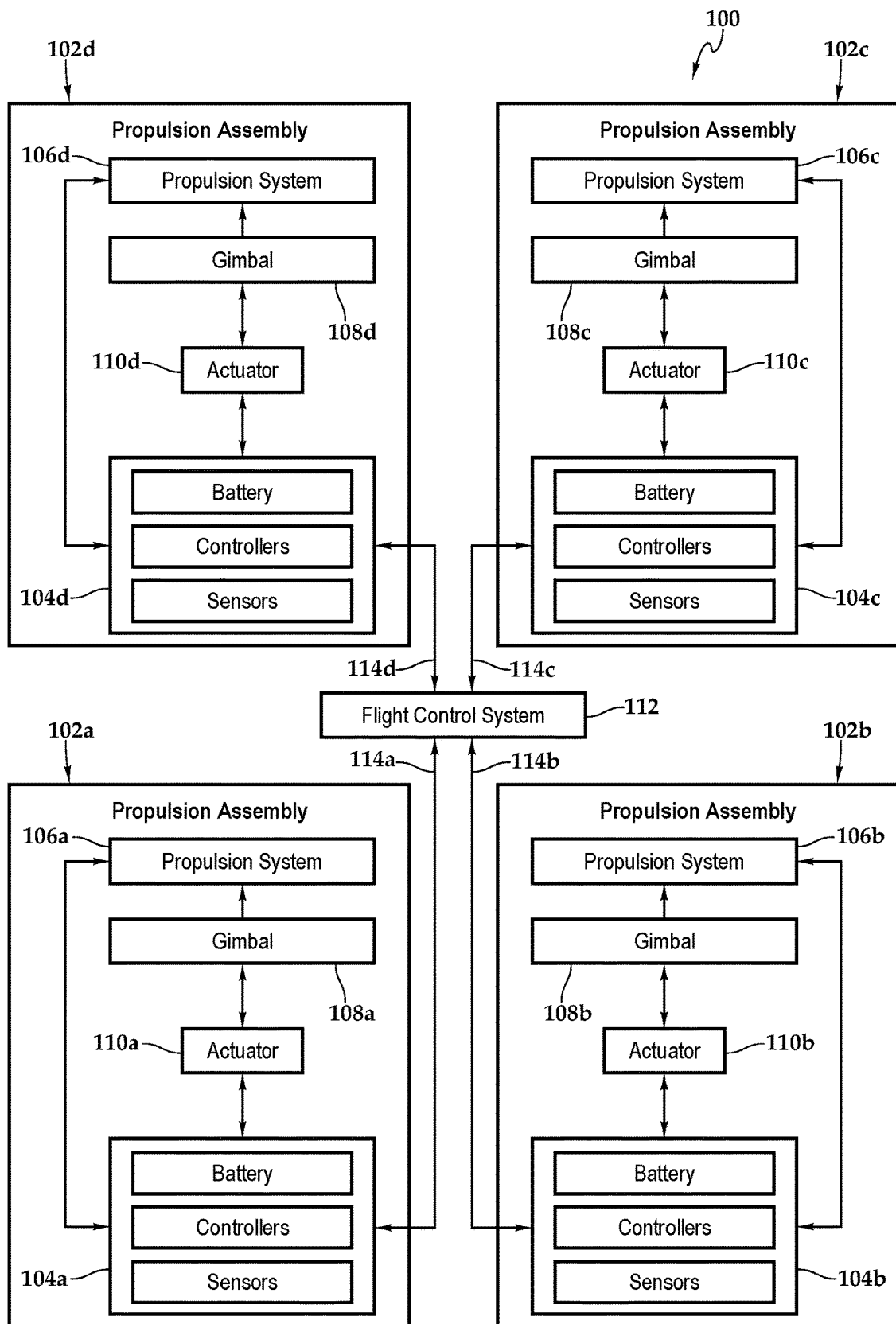
FIG. 3 is a block diagram of one implementation of a thrust array and a flight control system for a payload deployment aircraft in accordance with embodiments of the present disclosure.

Referring next to FIG. 3, a block diagram illustrates one implementation of a thrust array and flight control system for an aircraft 100 that is representative of aircraft 10 discussed herein. Specifically, aircraft 100 includes four propulsion assemblies 102*a*, 102*b*, 102*c*, 102*d* that form a two-dimensional thrust array of thrust vectoring propulsion assemblies. Propulsion assembly 102*a* includes an electronics node 104*a* depicted as including controllers, sensors and one or more batteries. Propulsion assembly 102*a* also includes a propulsion system 106*a* described herein as including an electric motor and a rotor assembly. In the illustrated embodiment, propulsion assembly 102*a* includes a two-axis gimbal 108*a* operated by one or more actuators 110*a*. In other embodiments, propulsion assembly 102*a* may include a single-axis gimbal or other mechanism for thrust vectoring. In still other embodiments, propulsion assembly 102*a* may be a non-thrust vectoring propulsion assembly.

Propulsion assembly 102*b* includes an electronics node 104*b* depicted as including controllers, sensors and one or more batteries. Propulsion assembly 102*b* also includes a propulsion system 106*b* and a two-axis gimbal 108*b* operated by one or more actuators 110*b*. Propulsion assembly 102*c* includes an electronics node 104*c* depicted as including controllers, sensors and one or more batteries. Propulsion assembly 102*c* also includes a propulsion system 106*c* and a two-axis gimbal 108*c* operated by one or more actuators 110*c*. Propulsion assembly 102*d* includes an electronics node 104*d* depicted as including controllers, sensors and one or more batteries. Propulsion assembly 102*d* also includes a propulsion system 106*d* and a two-axis gimbal 108*d* operated by one or more actuators 110*d*. A flight control system 112 is operably associated with each of propulsion assemblies 102*a*, 102*b*, 102*c*, 102*d* and is linked to the electronic nodes 104*a*, 104*b*, 104*c*, 104*d* by a fly-by-wire communications network depicted as arrows 114*a*, 114*b*, 114*c*, 114*d*. Flight control system 112 receives sensor data from and sends commands to propulsion assemblies 102*a*, 102*b*, 102*c*, 102*d* to enable flight control system 112 to independently control each of propulsion assemblies 102*a*, 102*b*, 102*c*, 102*d*, as discussed herein.

Figure 4:
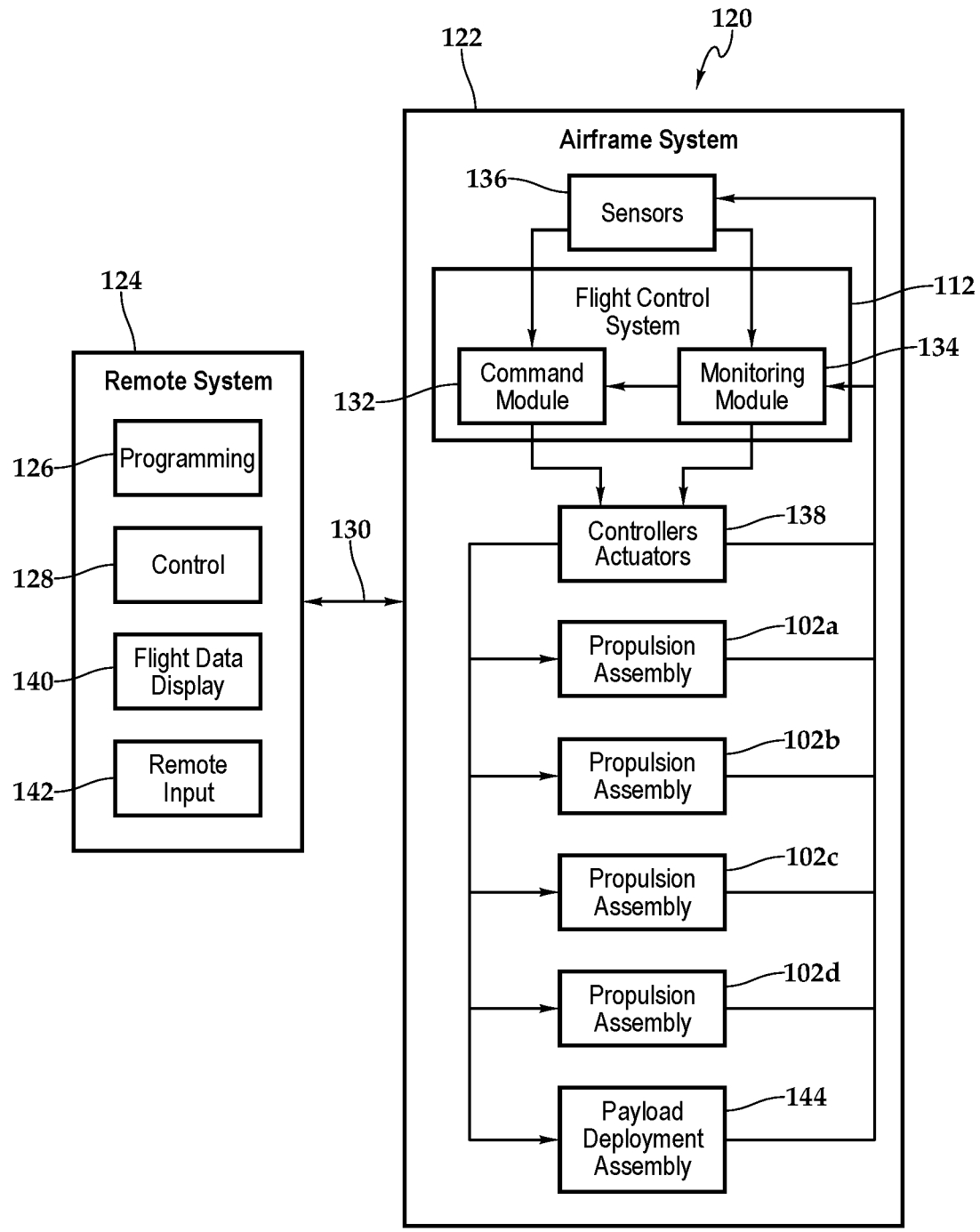
FIG. 4 is a block diagram of autonomous and remote control systems for a payload deployment aircraft in accordance with embodiments of the present disclosure.

Referring additionally to FIG. 4 in the drawings, a block diagram depicts a control system 120 operable for use with aircraft 100 or aircraft 10 of the present disclosure. In the illustrated embodiment, system 120 includes two primary computer based subsystems; namely, an airframe system 122 and a remote system 124. In some implementations, remote system 124 includes a programming application 126 and a remote control application 128. Programming application 126 enables a user to provide a flight plan and mission information to aircraft 100 such that flight control system 112 may engage in autonomous control over aircraft 100. For example, programming application 126 may communicate with flight control system 112 over a wired or wireless communication channel 130 to provide a flight plan including, for example, a starting point, a trail of waypoints and an ending point such that flight control system 112 may use waypoint navigation during the mission. In addition, programming application 126 may provide one or more tasks to flight control system 112 for aircraft 100 to accomplish during the mission such as deployment of payload 24 at a desired location. Following programming, aircraft 100 may operate autonomously responsive to commands generated by flight control system 112.

In the illustrated embodiment, flight control system 112 includes a command module 132 and a monitoring module 134. It is to be understood by those skilled in the art that these and other modules executed by flight control system 112 may be implemented in a variety of forms including hardware, software, firmware, special purpose processors and combinations thereof. Flight control system 112 receives input from a variety of sources including internal sources such as sensors 136, controllers/actuators 138, propulsion assemblies 102*a*, 102*b*, 102*c*, 102*d* and payload deployment assembly 144 as well as external sources such as remote system 124, global positioning system satellites or other location positioning systems and the like.

During the various operating modes of aircraft 100 including the vertical takeoff and landing flight mode, the hover flight mode, the forward flight mode and transitions therebetween, command module 132 provides commands to controllers/actuators 138. These commands enable independent operation of each propulsion assembly 102a, 102b, 102c, 102d including rotor speed, thrust vector and the like. Flight control system 112 receives feedback from controllers/actuators 138 and each propulsion assembly 102a, 102b, 102c, 102d. This feedback is processes by monitoring module 134 that can supply correction data and other information to command module 132 and/or controllers/actuators 138. Sensors 136, such as an attitude and heading reference system (AHRS) with solid-state or microelectromechanical systems (MEMS) gyroscopes, accelerometers and magnetometers as well as other sensors including positioning sensors, speed sensors, environmental sensors, fuel sensors, temperature sensors, location sensors and the like also provide information to flight control system 112 to further enhance autonomous control capabilities. Upon landing at the desired location, flight control system 112 is configured to cause payload deployment assembly 144 to deploy the payload from the cargo pod, as discussed herein.

Some or all of the autonomous control capability of flight control system 112 can be augmented or supplanted by remote flight control from, for example, remote system 124. Remote system 124 may include one or computing systems that may be implemented on general-purpose computers, special purpose computers or other machines with memory and processing capability. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 124 communicates with flight control system 112 via a communication link 130 that may include both wired and wireless connections.

While operating remote control application 128, remote system 124 is configured to display information relating to one or more aircraft of the present disclosure on one or more flight data display devices 140. Display devices 140 may be configured in any suitable form, including, for example, liquid crystal displays, light emitting diode displays or any suitable type of display. Remote system 124 may also include audio output and input devices such as a microphone, speakers and/or an audio port allowing an operator to communicate with other operators or a base station. The display device 140 may also serve as a remote input device 142 if a touch screen display implementation is used, however, other remote input devices, such as a keyboard or joystick, may alternatively be used to allow an operator to provide control commands to an aircraft being operated responsive to remote control.

Figure 5A:
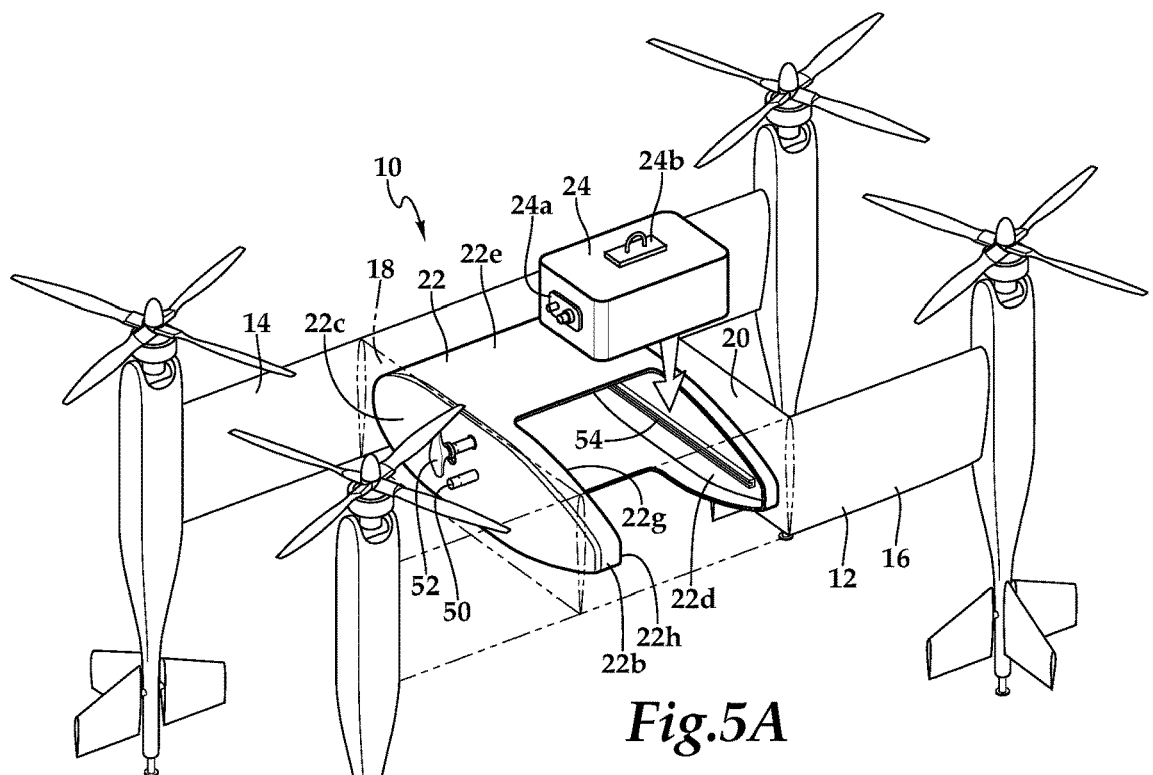
FIGS. 5A-5H are schematic illustrations of a payload deployment aircraft in various configurations in accordance with embodiments of the present disclosure.

Referring additionally to FIGS. 5A-5H, the loading, transportation and deployment of a payload in a cargo pod of a payload deployment aircraft will now be described. In these figures, a portion of wing 16 and all of pylon 18 are presented in phantom lines to better illustrate the configurations of cargo pod 22 relative thereto. FIG. 5A shows cargo pod 22 in a loading configuration wherein cargo pod 22 is oriented substantially perpendicular to wings 14, 16 and pylons 18, 20 such that the front 22e including a front opening 22g are substantially horizontally oriented to provide access to the interior of cargo pod 22 from above for the loading of payload 24. In the illustrated embodiment, cargo pod 22 is fixed in the loading configuration to prevent cargo pod 22 from rotating relative to pylons 18, 20 during the loading process. Cargo pod 22 is rotatable about a pair of shafts 50 that extend between sides 22c, 22d of cargo pod 22 and pylons 18, 20, only one shaft 50 being visible in the figures. Quick release pins 52 extend through pylons 18, 20 into receiving holes in sides 22c, 22d of cargo pod 22, thereby locking cargo pod 22 in the loading configuration, only one quick release pin 52 being visible in the figures.

Figure 5B:
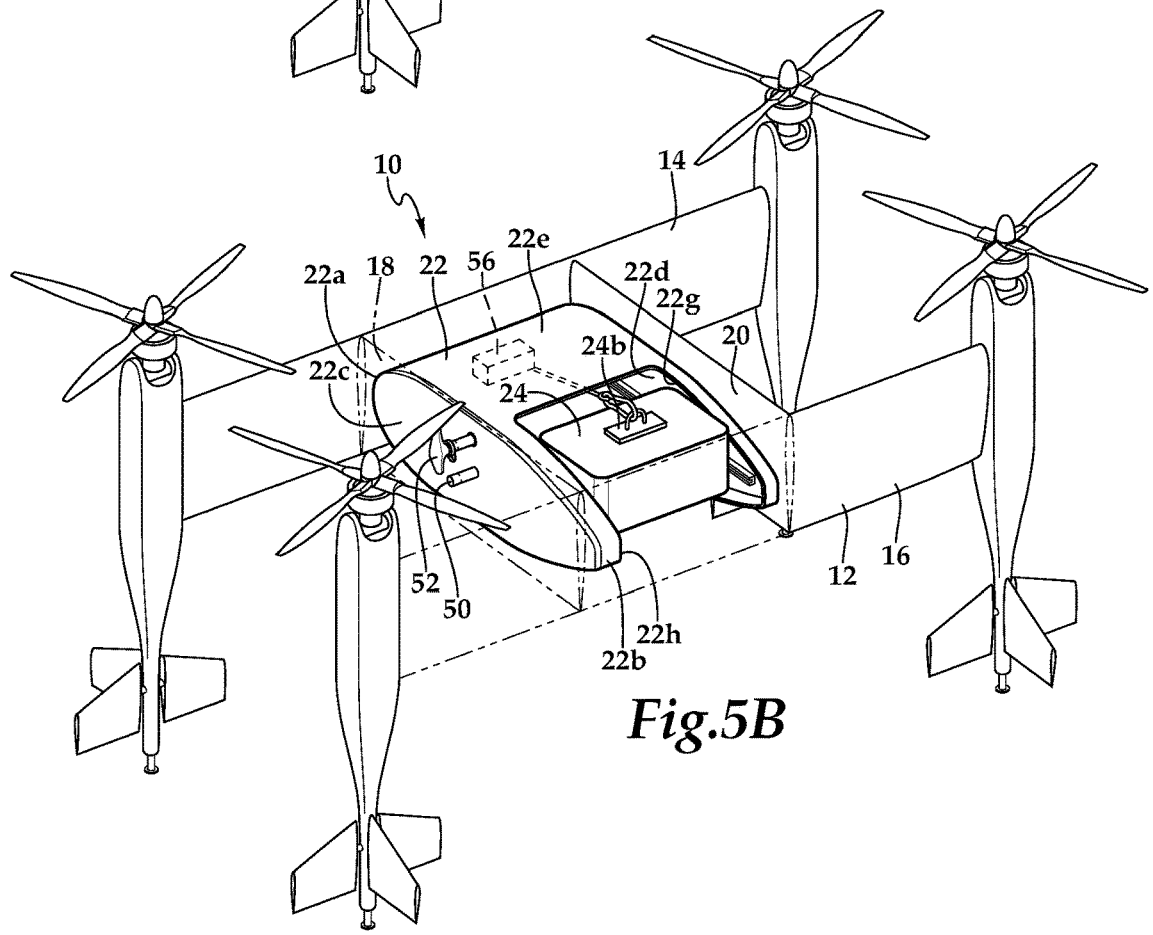
Figure 5C:
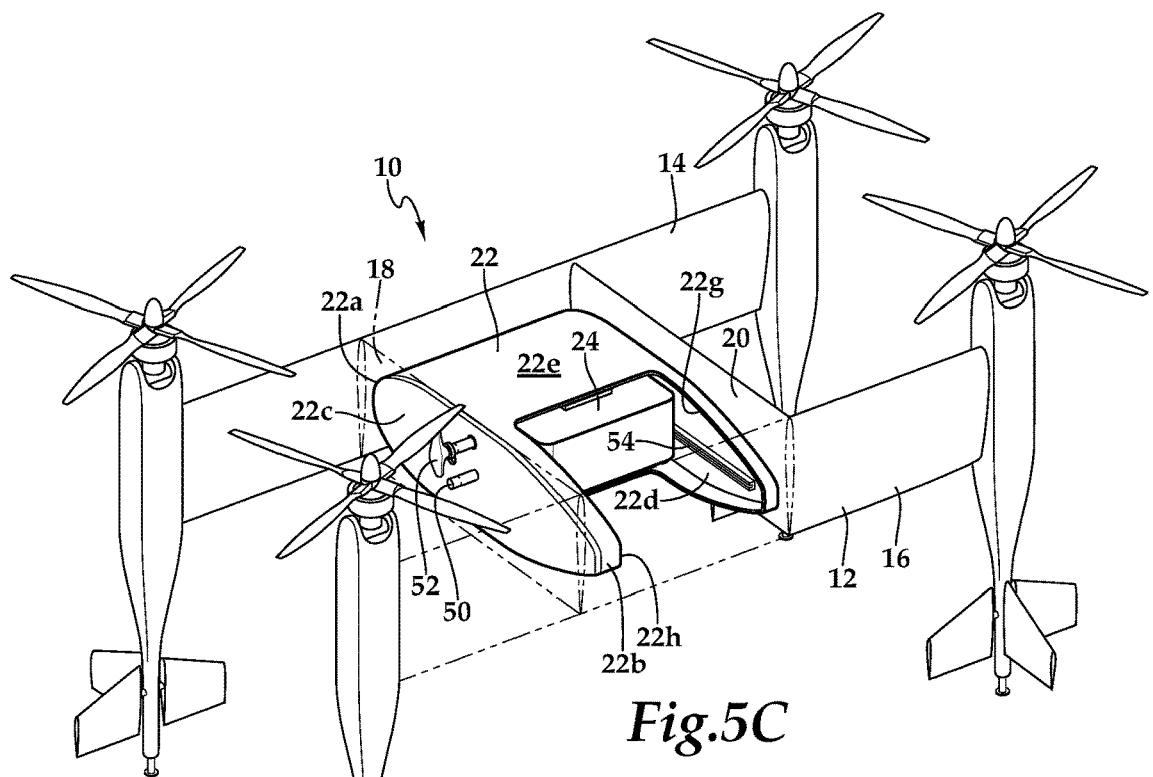

Cargo pod 22 includes a payload support assembly depicted as including a rail system 54 having oppositely disposed rails on the interior of sides 22c, 22d of cargo pod 22. In the illustrated embodiment, payload 24 includes a pair of opposite disposed detent assemblies 24a that are configured to snap into rail system 54, as best seen in FIG. 5B. Cargo pod 22 includes a payload deployment assembly depicted as including a cable system 56. In the illustrated embodiment, cable system 56 is attached to an eye latch assembly 24b of payload 24. Payload 24 may now be shifted toward the forward end 22a of cargo pod 22 by retracting cable system 56 or manually until cargo pod 22 is received within a locking system of cargo pod 22, as best seen in FIG. 5C. For example, detent assemblies 24a may be received within notches (not visible) in rail system 54 which may serve as the locking system to secure payload 24 in cargo pod 22. Alternatively or additionally, cable system 56 may serve as the locking system to secure payload 24 in cargo pod 22.

Figure 5D:
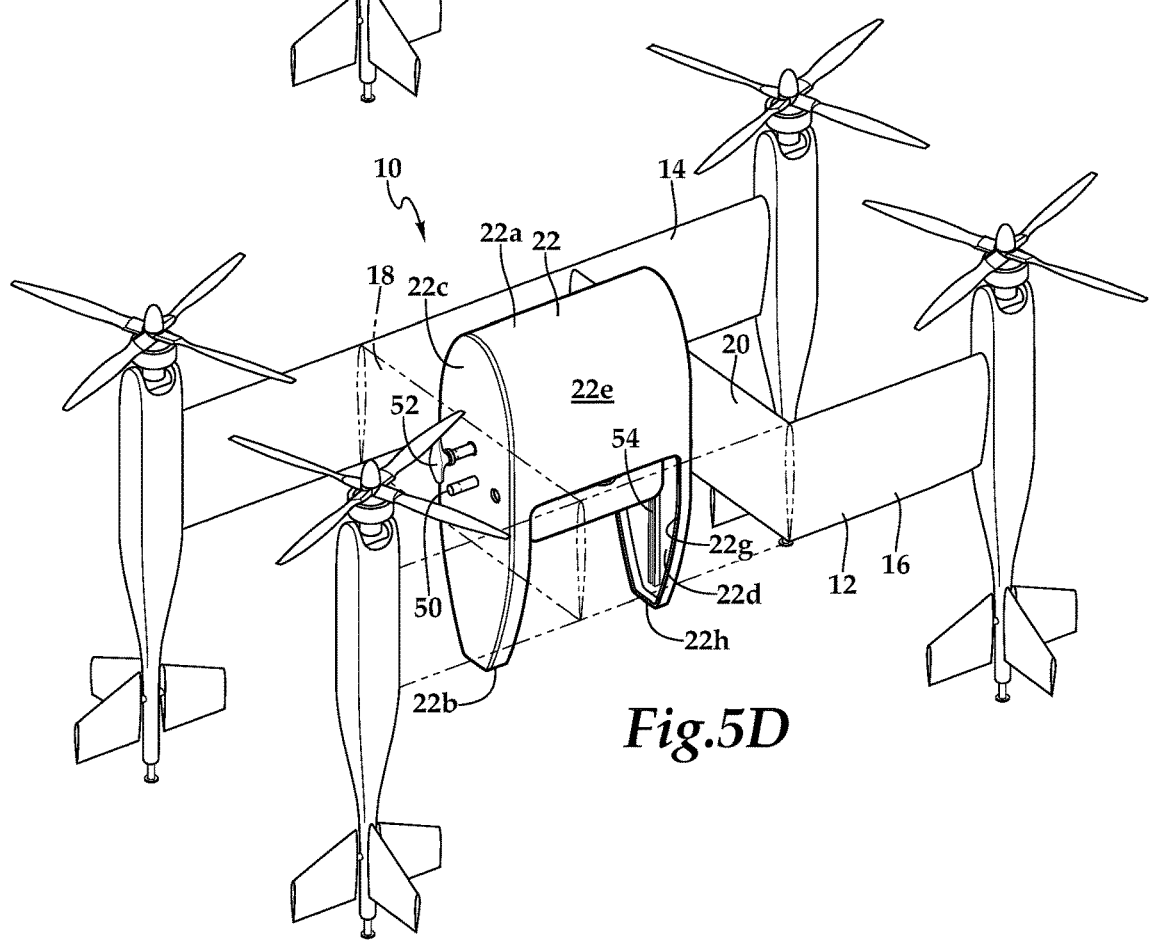

Once payload 24 is secured within cargo pod 22, cargo pod 22 may be rotated relative to pylons 18, 20 from the loading configuration to the transportation and deployment configuration wherein cargo pod 22 is oriented substantially parallel to wings 14, 16 and pylons 18, 20 such that the aft end 22b including an aft opening 22h are substantially horizontally oriented, as best seen in FIG. 5D. This is achieved by releasing quick release pins 52 from sides 22c, 22d of cargo pod 22 and rotating cargo pod 22 about shafts 50. Once rotated, cargo pod 22 can be fixed in the transportation and deployment configuration by inserting quick release pins 52 through pylons 18, 20 and into the receiving holes in sides 22c, 22d of cargo pod 22. In the illustrated embodiment, cargo pod 22 is an open air cargo pod in which front opening 22g and aft opening 22h remain uncovered during transportation of payload 24. In this embodiment, front opening 22g and aft opening 22h are substantially normal to one another and front opening 22g and aft opening 22h intersect each other.

Figure 5E:
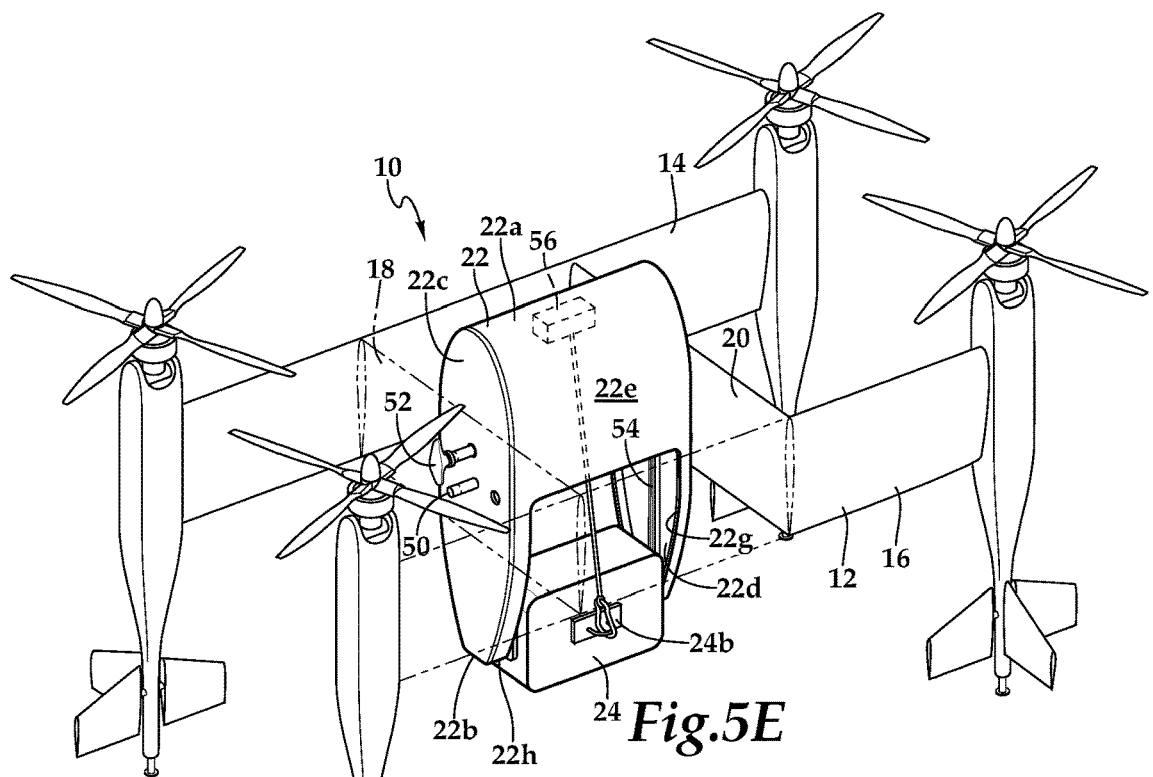
Figure 5F:
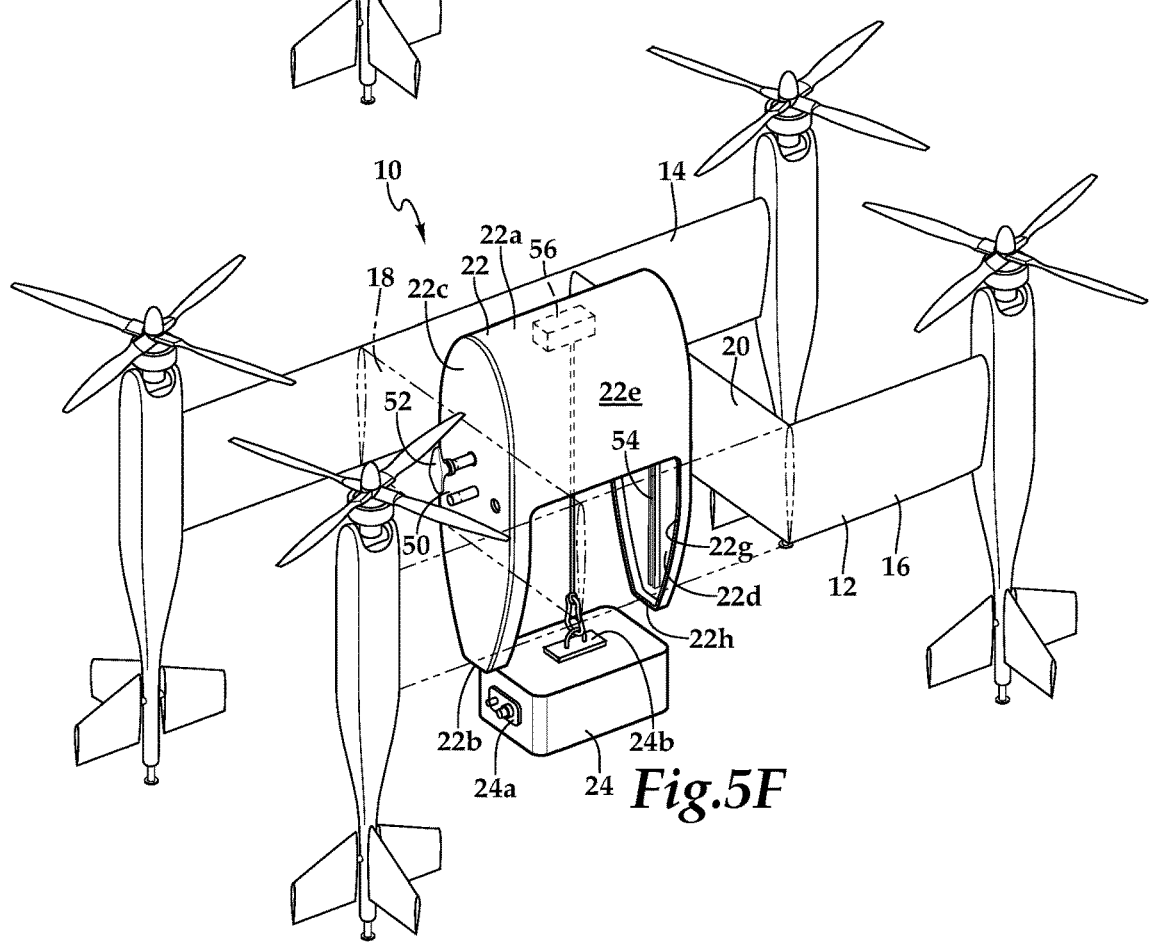

As discussed herein, aircraft 10 may autonomously fly to and land in a tailsitter orientation at the desired location for payload deployment responsive to commands from flight control system 30. Once aircraft 10 has landed at the desired location, payload 24 may be released from the locking system of cargo pod 22 such as by releasing detent assemblies 24a from within the notches in rail system 54. Thereafter, cable system 56 may guild or control the descent of payload 24 down rail system 54, as best seen in FIG. 5E. For example, cable system 56 may be an actuated system that lowers payload 24 toward the ground at a selected rate. Alternatively, cable system 56 may be a passive system that provides certain resistance, such as with a tensioner spring, as gravity causes payload 24 to slide down rail system 54. In the illustrated embodiment, the configuration of cable system 56, rail system 54 and eye latch assembly 24b create a payload self-orienting system that allows payload 24 to rotate ninety degrees upon separation from rail system 54, as best seen in FIG. 5F.

Figure 5G:
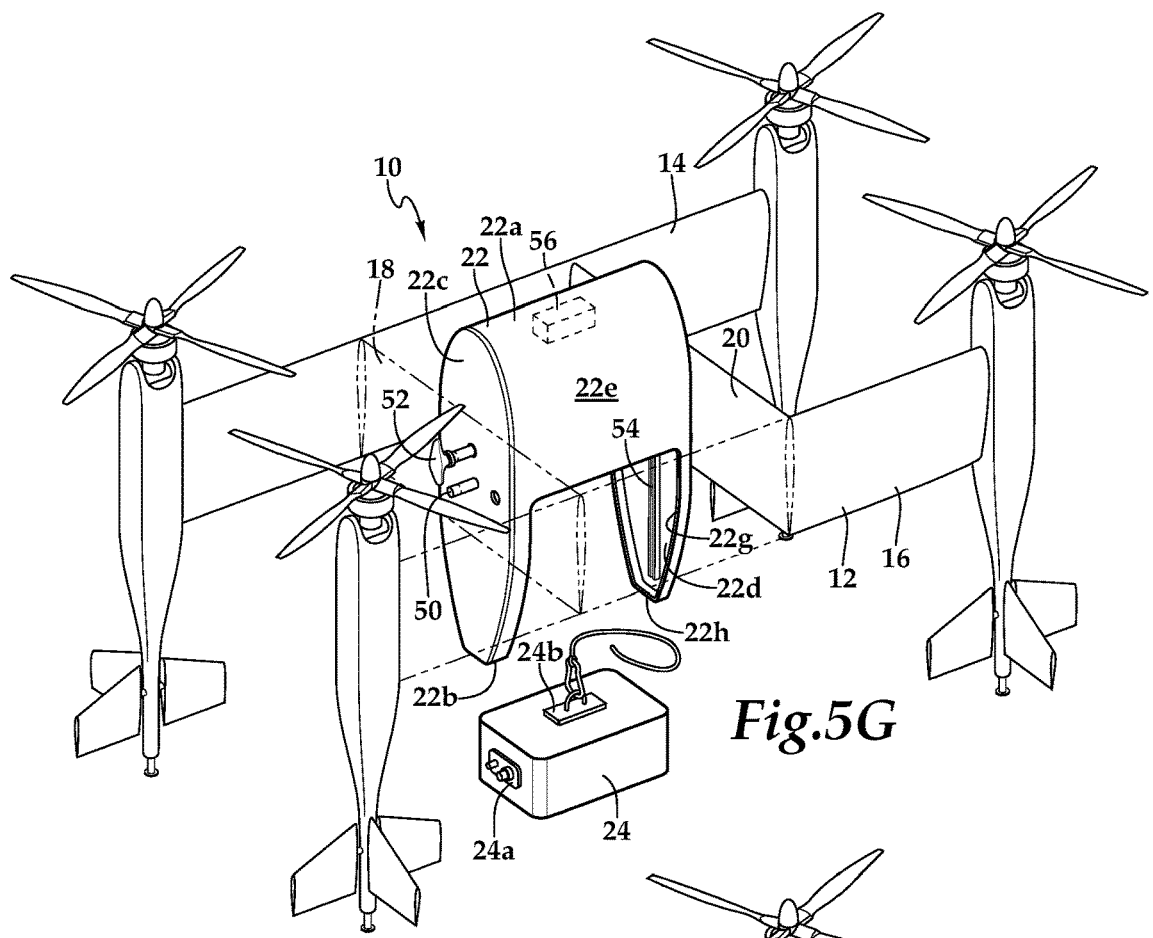
Figure 5H:
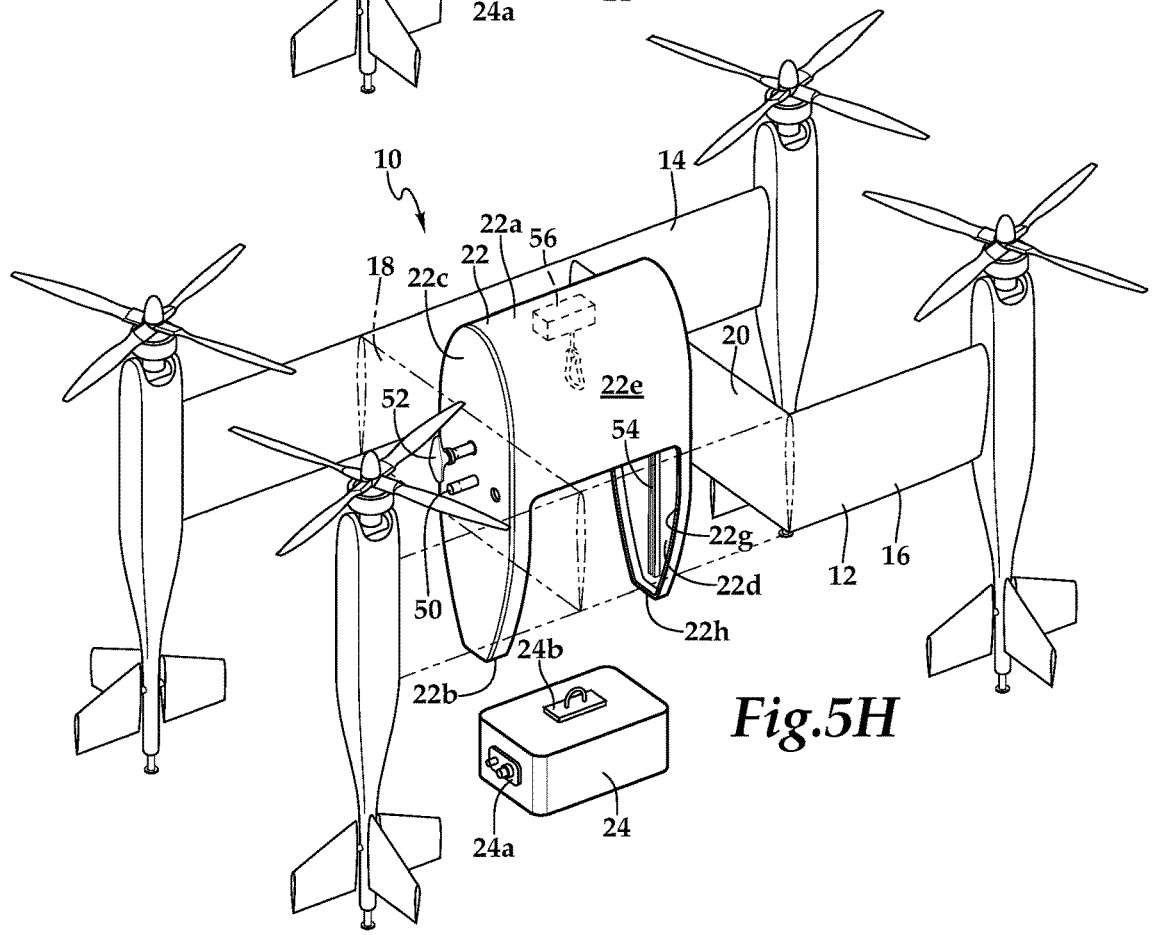

Payload 24 may now be placed on the ground in the desired orientation, as best seen in FIG. 5G. In the illustrated embodiment, cable system 56 is an expendable cable system wherein the cable is released from the reel and stays with payload 24. Alternatively, cable system 56 may be a retractable cable system wherein the cable is released from eye latch assembly 24b and retracted into cargo pod 22, as best seen in FIG. 5H. As another alternative, eye latch assembly 24b may be released from payload 24 and retracted into cargo pod 22 together with the retractable cable. As illustrated, cargo pod 22 can be specifically designed to transport and deploy a particular payload having particular characteristics and requirements. In this case, payload 24 and cargo pod 22 included a specific payload support assembly and a specific payload deployment assembly designed to receive a payload having detent assemblies 24a for securing payload 24 in rail system 54 and eye latch assembly 24b on the top of payload 24 to enable coupling to cable system 56 and to enable self-orienting of payload 24 upon separation from rail system 54. It should be understood by those having ordinary skill in the art, however, that a cargo pod of the present disclosure can alternatively be designed with the versatility to transport and deploy payloads of varying sizes, shapes, characteristics or requirements.

Figure 6A:
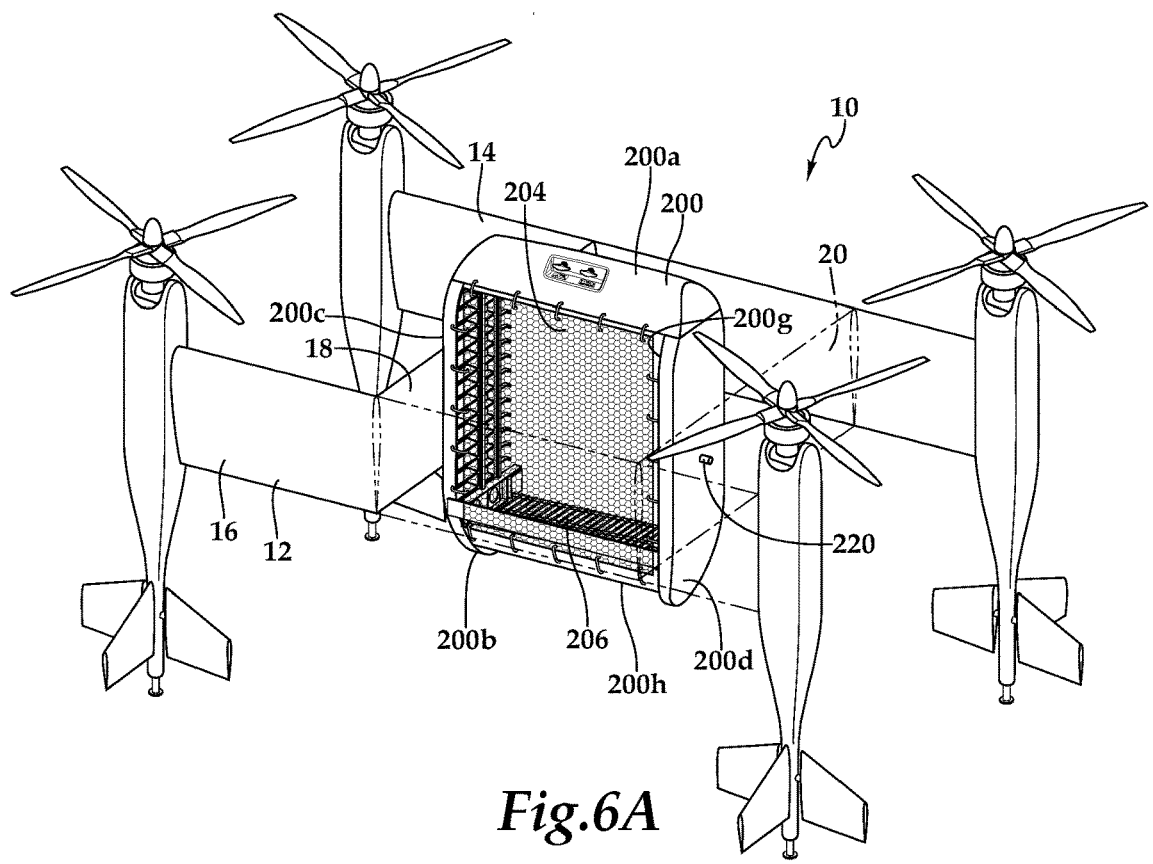
FIGS. 6A-6F are schematic illustrations of a payload deployment aircraft in various configurations in accordance with embodiments of the present disclosure.

For example, referring now to FIGS. 6A-6F, the loading, transportation and deployment of a payload in a cargo pod of a payload deployment aircraft having a variable payload cavity configurable based upon the size of the payload will now be described. In these figures, a portion of wing 16 and all of pylon 20 are presented in phantom lines to better illustrate the configurations of cargo pod 200 relative thereto. FIG. 6A shows cargo pod 200 in a transportation and deployment configuration prior to loading of a payload 202 therein. In the transportation and deployment configuration, cargo pod 200 is oriented substantially parallel to wings 14, 16 and pylons 18, 20 such that a front opening 200g is substantially vertically oriented and an aft opening 200h is substantially horizontally oriented. In the illustrated embodiment, cargo pod 200 is a partially open air cargo pod that incorporates a netting system 204 to selectively cover front opening 200g and a gate system 206 to selectively cover aft opening 200h. In this embodiment, front opening 200g and aft opening 200h are substantially normal to one another and front opening 200g and aft opening 200h are considered to intersect each other.

Figure 7:
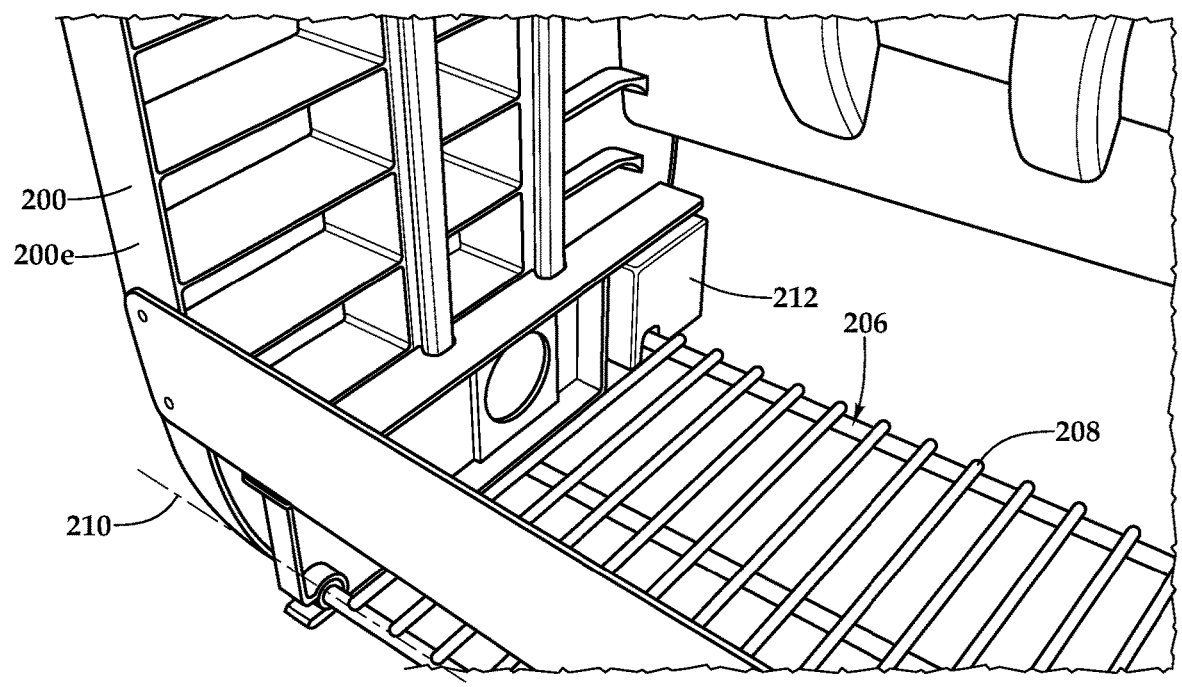
FIG. 7 is a detailed view of a gate system of a cargo pod for use on a payload deployment aircraft in accordance with embodiments of the present disclosure.
Figure 8:
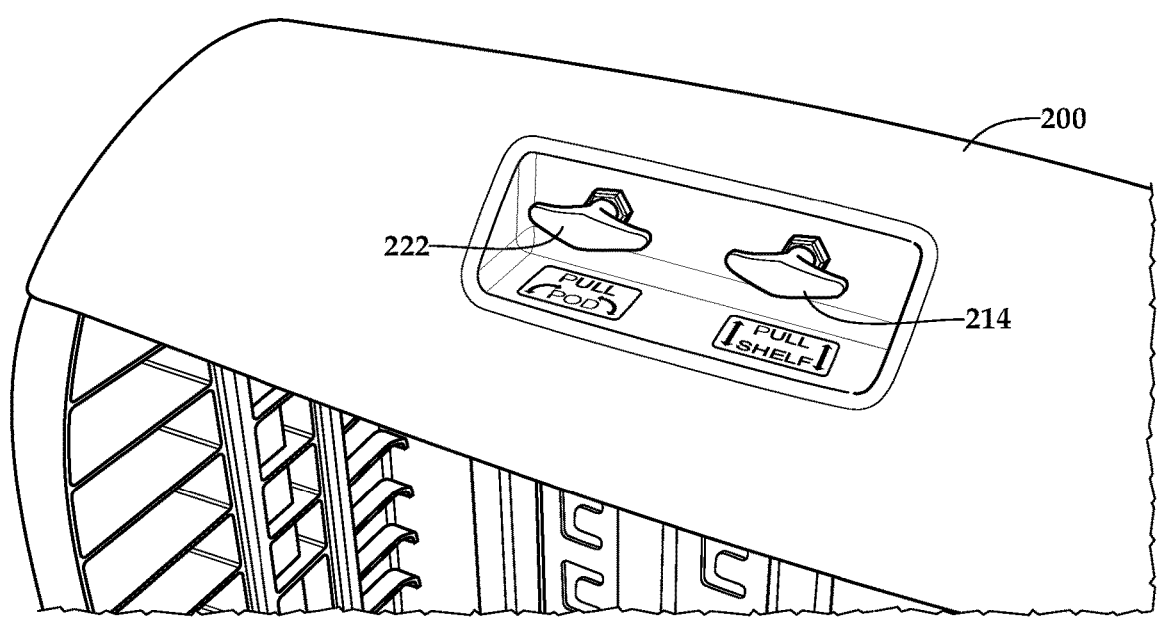
FIG. 8 is a detailed view of actuators of a cargo pod for use on a payload deployment aircraft in accordance with embodiments of the present disclosure.
Figure 9A:
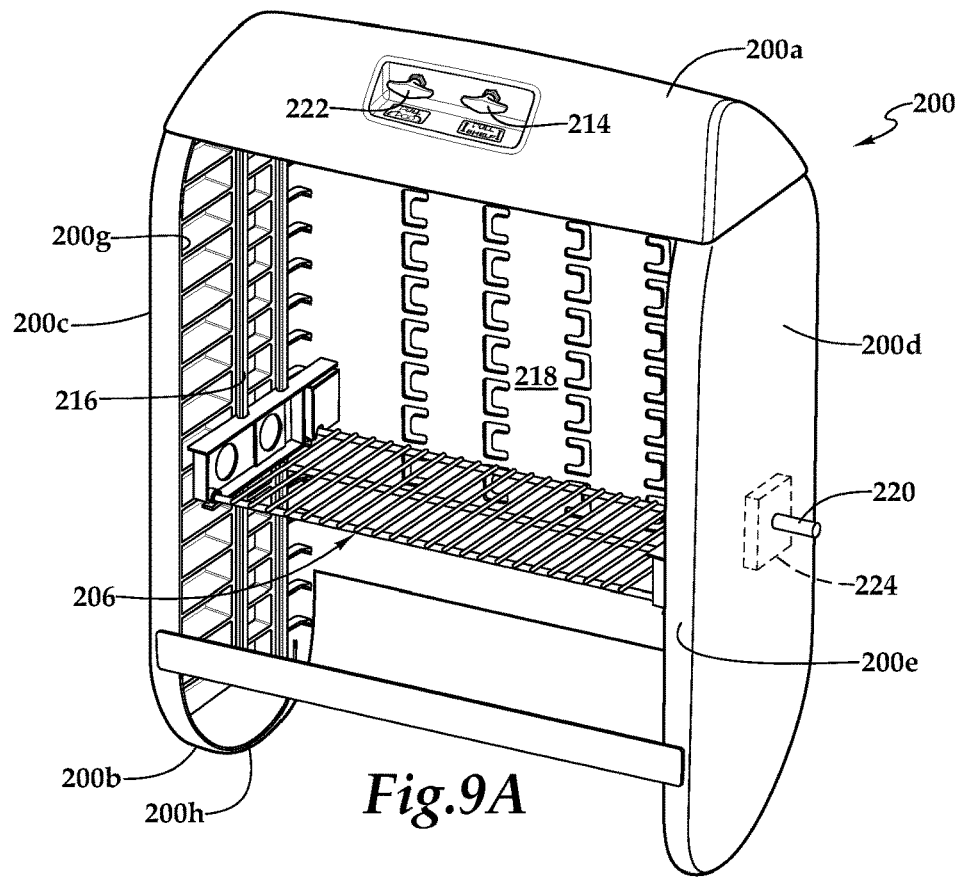
FIGS. 9A-9B are schematic illustrations of a cargo pod having a variable payload cavity for use on a payload deployment aircraft in accordance with embodiments of the present disclosure.
Figure 9B:
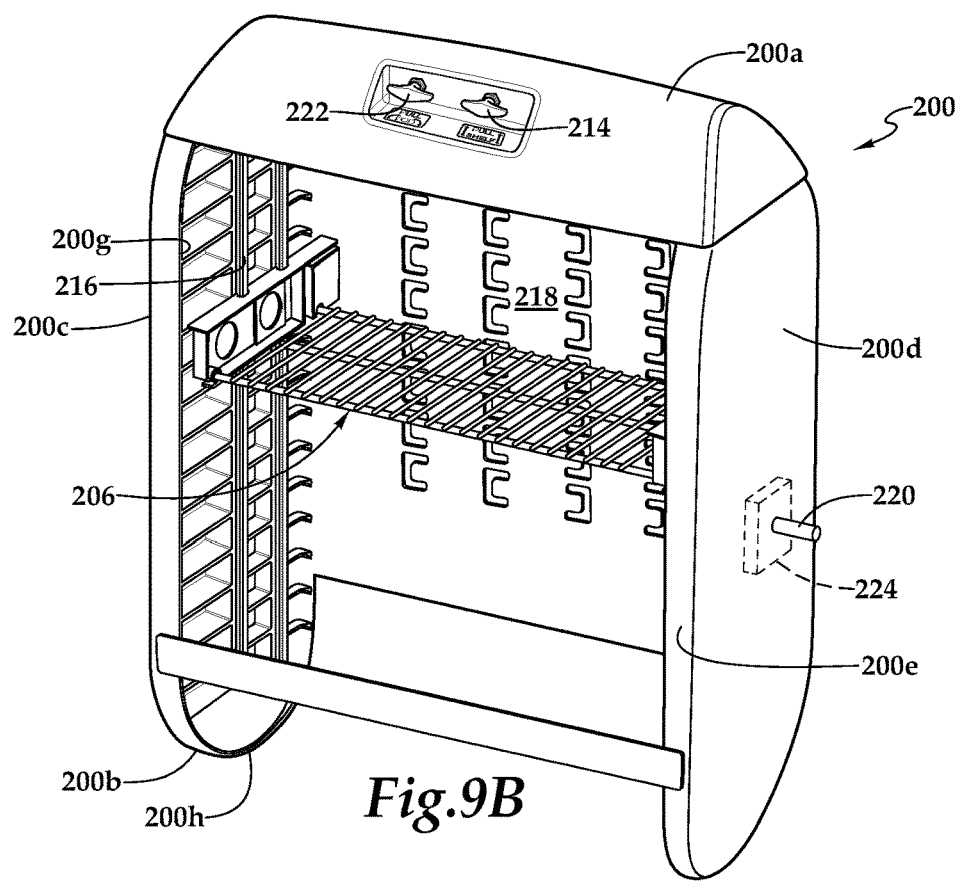

As best seen in FIG. 7, gate system 206 includes a gate 208 that has a pivot axis 210 proximate front 200e of cargo pod 200 and a latch system 212 that selectively secures gate 208 in the closed position. Gate 208 may be manually operated responsive to pulling plunger 214, as best seen in FIG. 8. Alternatively, gate 208 may be autonomously operated responsive to commands from flight control system 30 to latch system 212 to release gate 208. A best seen in FIGS. 9A-9B, gate system 206 is slidably received and lockable within a rail system 216 of cargo pod 200 such that the position of rail system 206 can be adjusted based on the size, shape, characteristics or other requirements of payload 202. Specifically, FIG. 9A depicts gate system 206 positioned such that variable payload cavity 218 of cargo pod 200 has about sixty percent of its maximum volume. Likewise, FIG. 9B depicts gate system 206 positioned such that variable payload cavity 218 of cargo pod 200 has about forty percent of its maximum volume. It should be understood by those having ordinary skill in the art that gate system 206 can be positioned at an infinite number of locations along rail system 216 to create an infinite number of volumes for variable payload cavity 218.

Figure 6B:
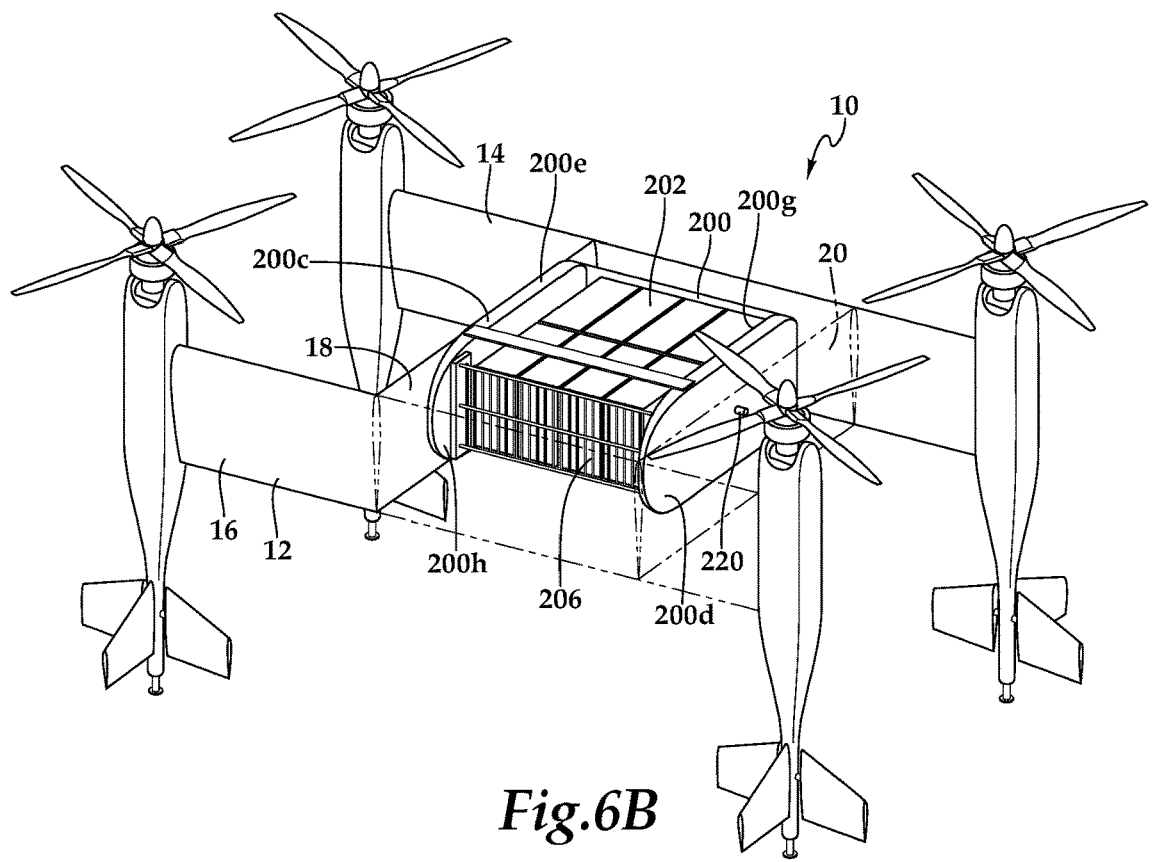

FIG. 6B shows cargo pod 200 in a loading configuration wherein cargo pod 200 is oriented substantially perpendicular to wings 14, 16 and pylons 18, 20 such that front opening 200g is substantially horizontally oriented and with netting system 204 removed to provide access to the interior of cargo pod 200 from above for the loading of payload 202. Gate system 206 is in the closed position and located such that variable payload cavity 218 has maximum volume. Cargo pod 200 is rotatable about a pair of shafts 220 that extends between sides 200c, 200d of cargo pod 200 and pylons 18, 20. In the illustrated embodiment, shafts 220 are fixed relative to pylons 18, 20 and cargo pod 200 is operable to selectively rotate about shafts 220 responsive to manual pulling of plunger 222 which releases brakes 224 that selectively allow and prevent rotation of cargo pod 200 about shafts 220, as best seen in FIGS. 8 and 9A-9B.

Figure 6C:
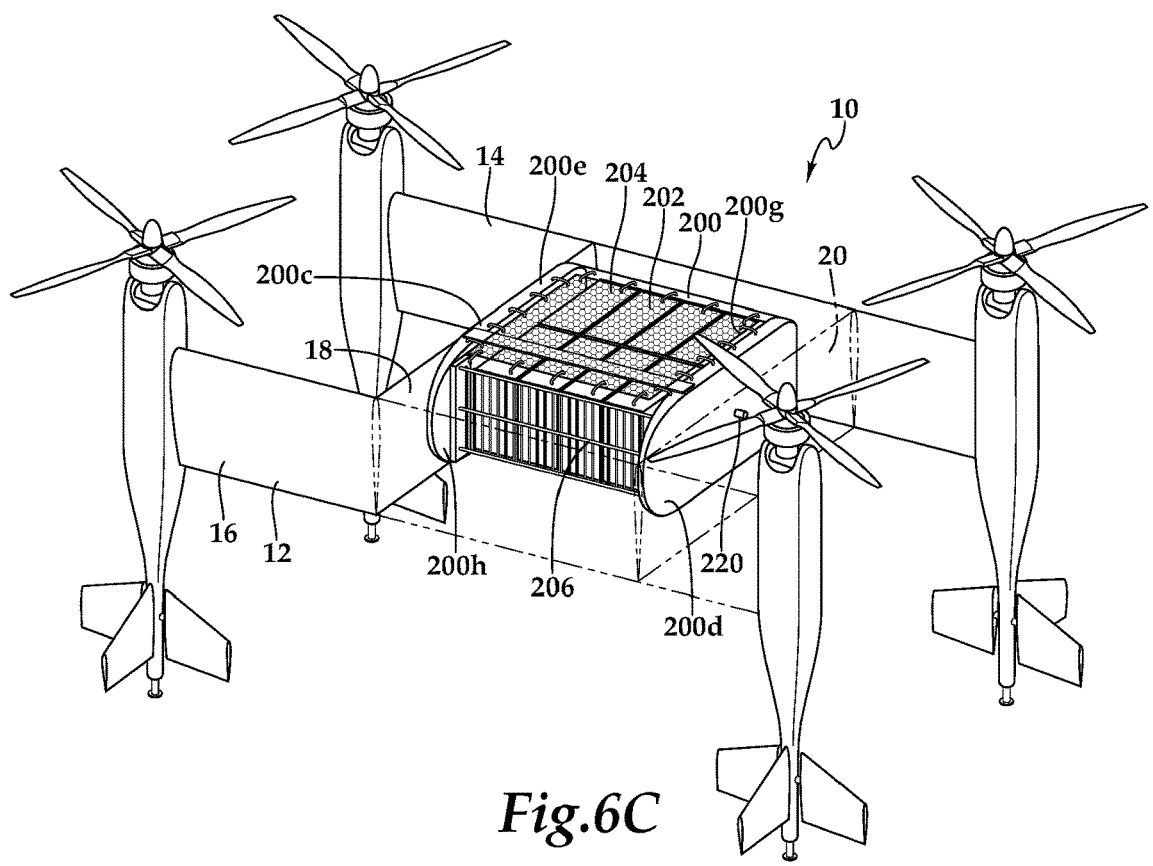
Figure 6D:
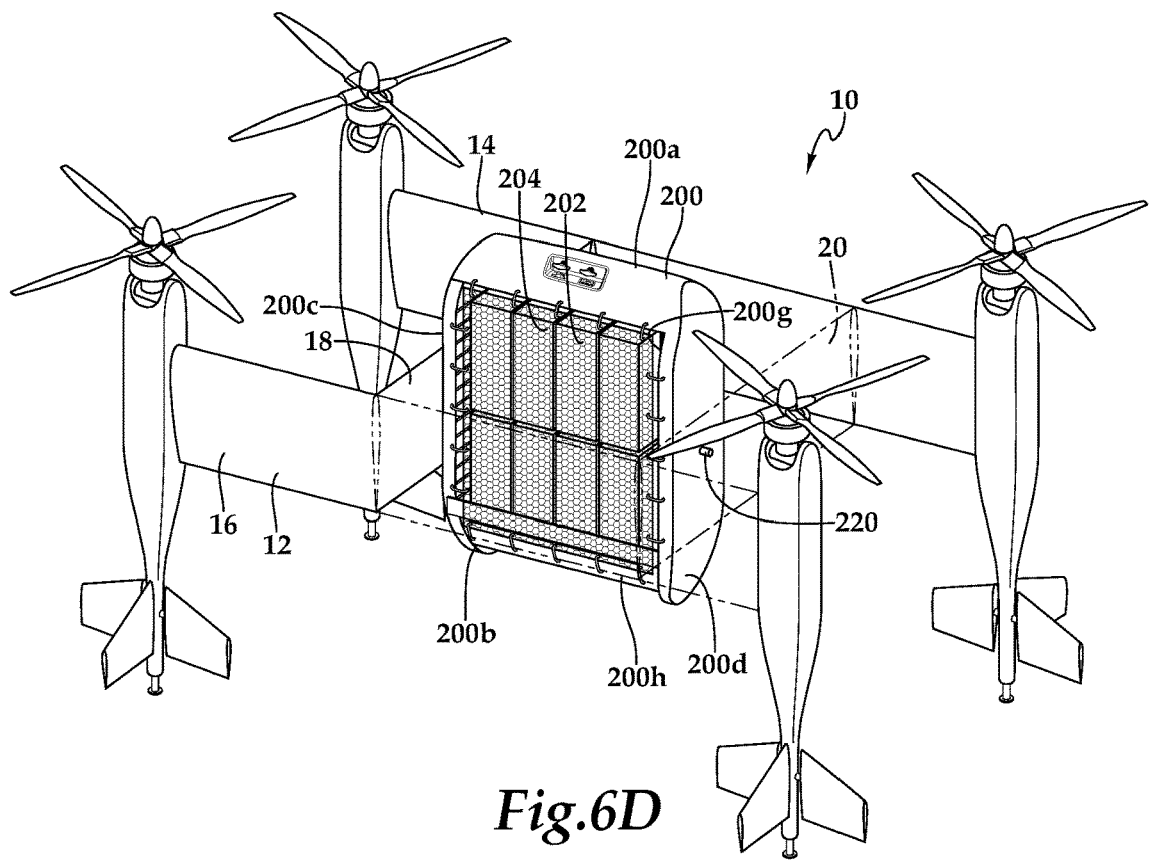

Referring again to FIG. 6B, cargo pod 200 is fixed in the loading configuration to prevent cargo pod 200 from rotating relative to pylons 18, 20 during loading of payload 202. Once payload 202 is loaded, netting system 204 is reattached to cover front opening 200g, as best seen in FIG. 6C. Gate system 206 and netting system 204 may be considered as the payload support assembly of cargo pod 200. Once payload 202 is secured within cargo pod 200, cargo pod 200 may be rotated relative to pylons 18, 20 from the loading configuration to the transportation and deployment configuration wherein cargo pod 200 is oriented substantially parallel to wings 14, 16 and pylons 18, 20 such that aft opening 200h is substantially horizontally oriented, as best seen in FIG. 6D. This is achieved by manually pulling plunger 222 which releases brakes 224 allowing rotation of cargo pod 200 about shafts 220 from the loading configuration to the transportation and deployment configuration then releasing plunger 222 to engage brakes 224 preventing further rotation of cargo pod 200.

Figure 6E:
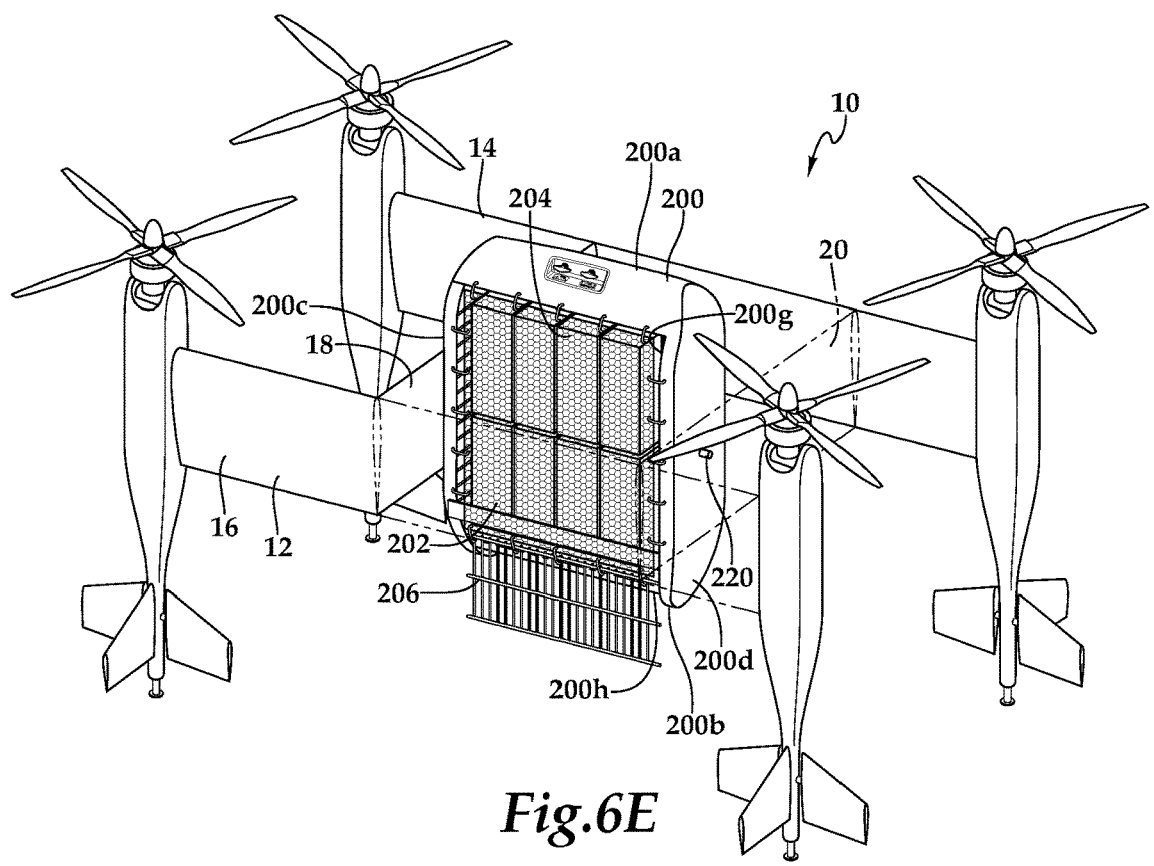
Figure 6F:
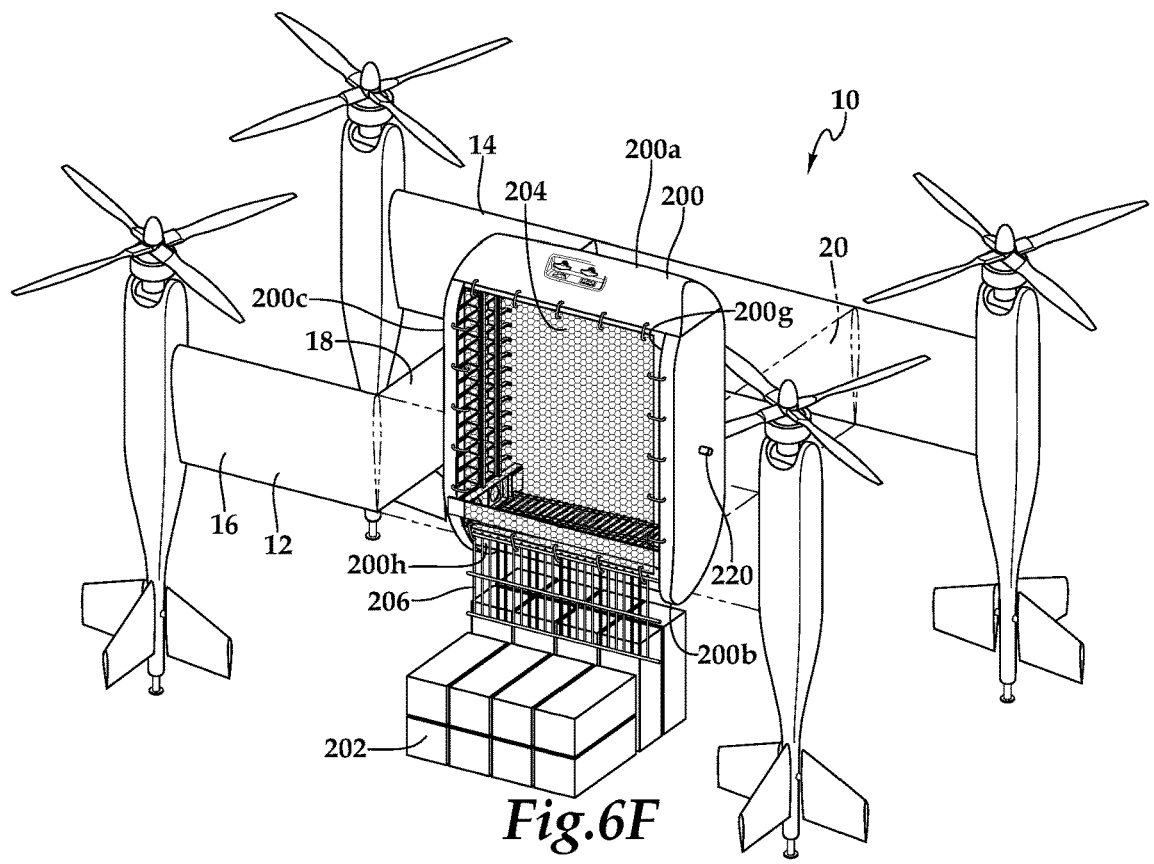

As discussed herein, aircraft 10 may autonomously fly to and land in a tailsitter orientation at the desired location for payload deployment responsive to commands from flight control system 30. Once aircraft 10 has landed at the desired location, payload 202 may be released from cargo pod 200 by autonomously or manually actuating gate system 206, as best seen in FIG. 6E. Thereafter, gravity may be utilized to cause payload 202 to exit aft opening 200h of cargo pod 200 and deploy payload 202 on the ground in the desired location, as best seen in FIG. 6F.

Figure 10A:
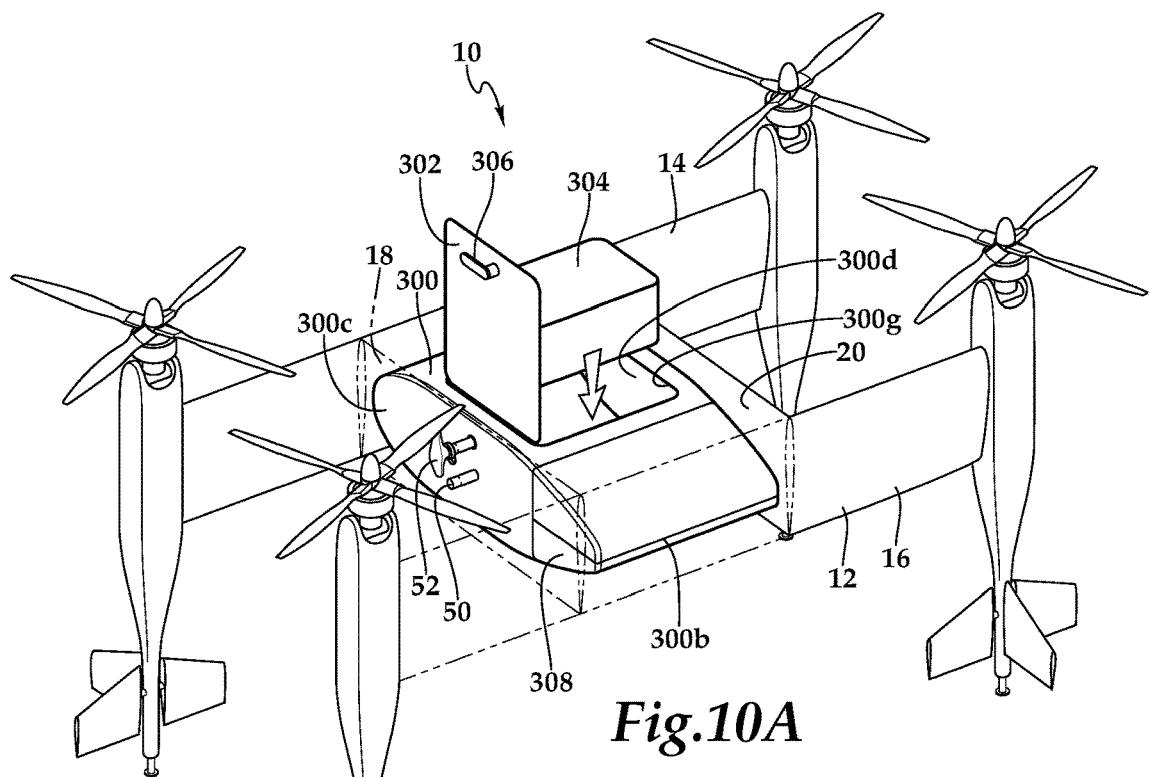
FIGS. 10A-10D are schematic illustrations of a payload deployment aircraft in various configurations in accordance with embodiments of the present disclosure.

Referring now to FIGS. 10A-10D, the loading, transportation and deployment of a payload in another embodiment of a cargo pod of a payload deployment aircraft will now be described. In these figures, a portion of wing 16 and all of pylon 18 are presented in phantom lines to better illustrate the configurations of cargo pod 300 relative thereto. FIG. 10A shows cargo pod 300 in a loading configuration wherein cargo pod 300 is oriented substantially perpendicular to wings 14, 16 and pylons 18, 20 such that a front opening 300g is substantially horizontally oriented and with front hatch 302 open to provide access to the interior of cargo pod 300 from above for the loading of payload 304. In the illustrated embodiment, cargo pod 300 is fixed in the loading configuration to prevent cargo pod 300 from rotating relative to pylons 18, 20 during the loading process. Cargo pod 300 is rotatable about a pair of shafts 50 that extends between sides 300c, 300d of cargo pod 300 and pylons 18, 20. Quick release pins 52 extend through pylons 18, 20 into receiving holes in sides 300c, 300d of cargo pod 300, thereby locking cargo pod 300 in the loading configuration.

Figure 10B:
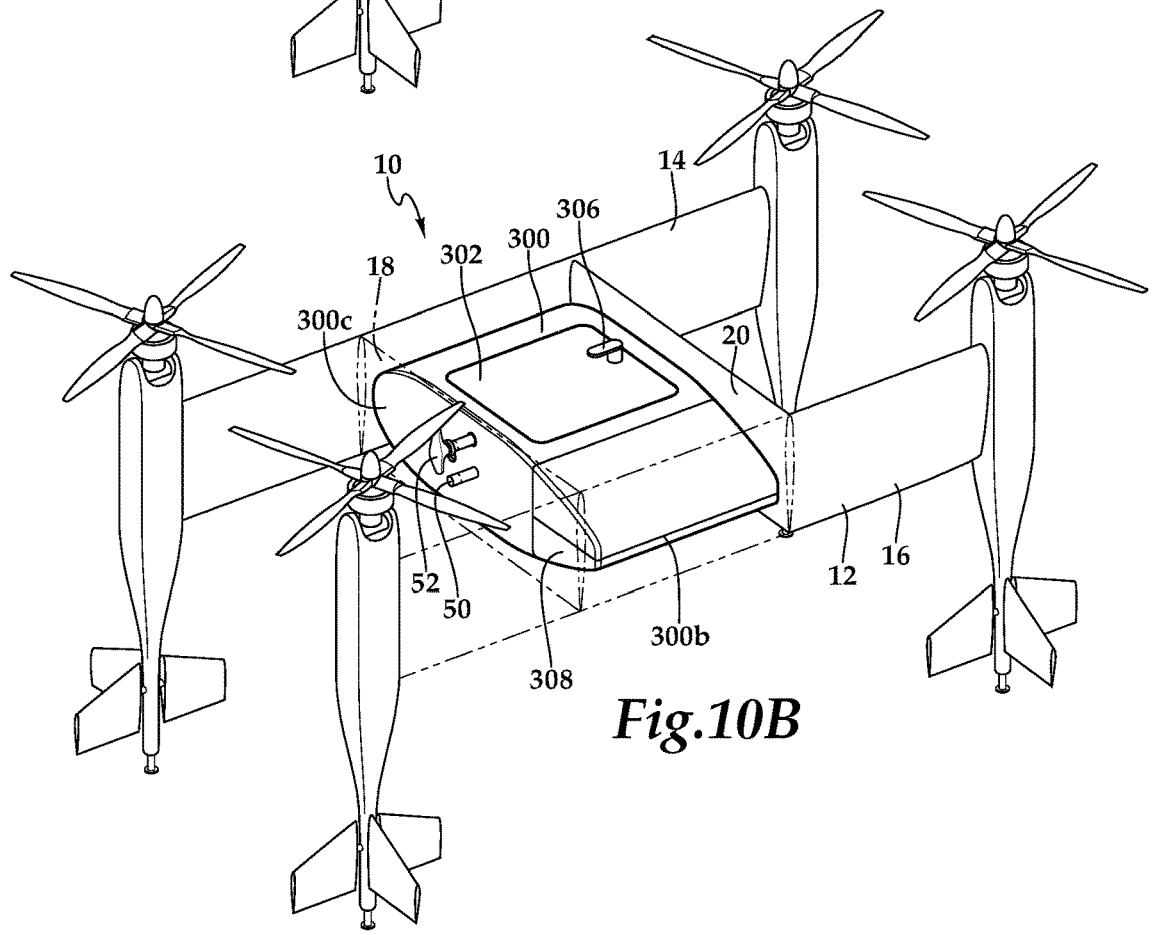
Figure 10C:
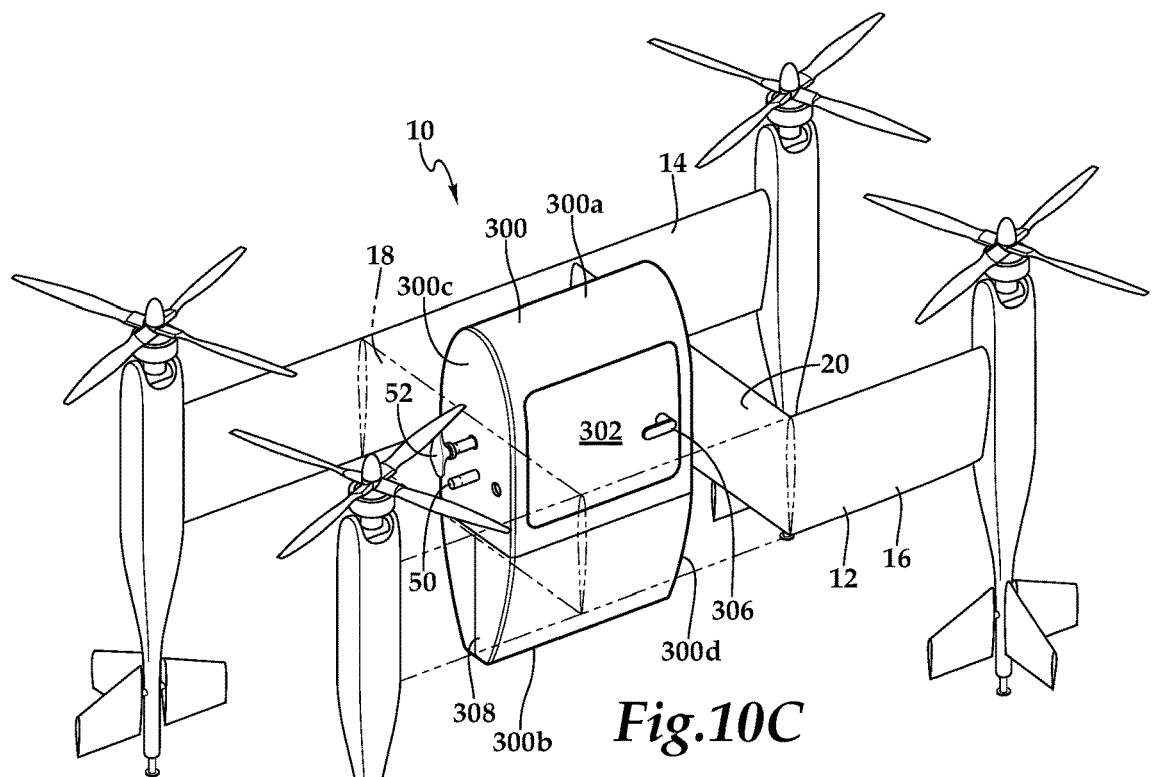

Cargo pod 300 includes a suitable payload support assembly to secure payload 304 in cargo pod 300 for transportation thereof. Once payload 304 is secured within cargo pod 300, front hatch 302 is closed to cover front opening 300g and is secured in the close position with a quarter turn latch mechanism 306, as best seen in FIG. 10B. Thereafter, cargo pod 300 may be rotated relative to pylons 18, 20 from the loading configuration to the transportation and deployment configuration wherein cargo pod 300 is oriented substantially parallel to wings 14, 16 and pylons 18, 20 such that the aft end 300b is substantially horizontally oriented, as best seen in FIG. 10C. This is achieved by releasing quick release pins 52 from sides 300c, 300d of cargo pod 300 and rotating cargo pod 300 about shafts 50. Once rotated, cargo pod 300 can be fixed in the transportation and deployment configuration by inserting quick release pins 52 through pylons 18, 20 and into the receiving holes in sides 300c, 300d of cargo pod 300. In the illustrated embodiment, cargo pod 300 is a cargo enclosure in which front opening 300g and aft opening 300h are covered during transportation of payload 304. In this embodiment, front opening 300g and aft opening 300h are substantially normal to one another but front opening 300g and aft opening 300h do not intersect.

Figure 10D:
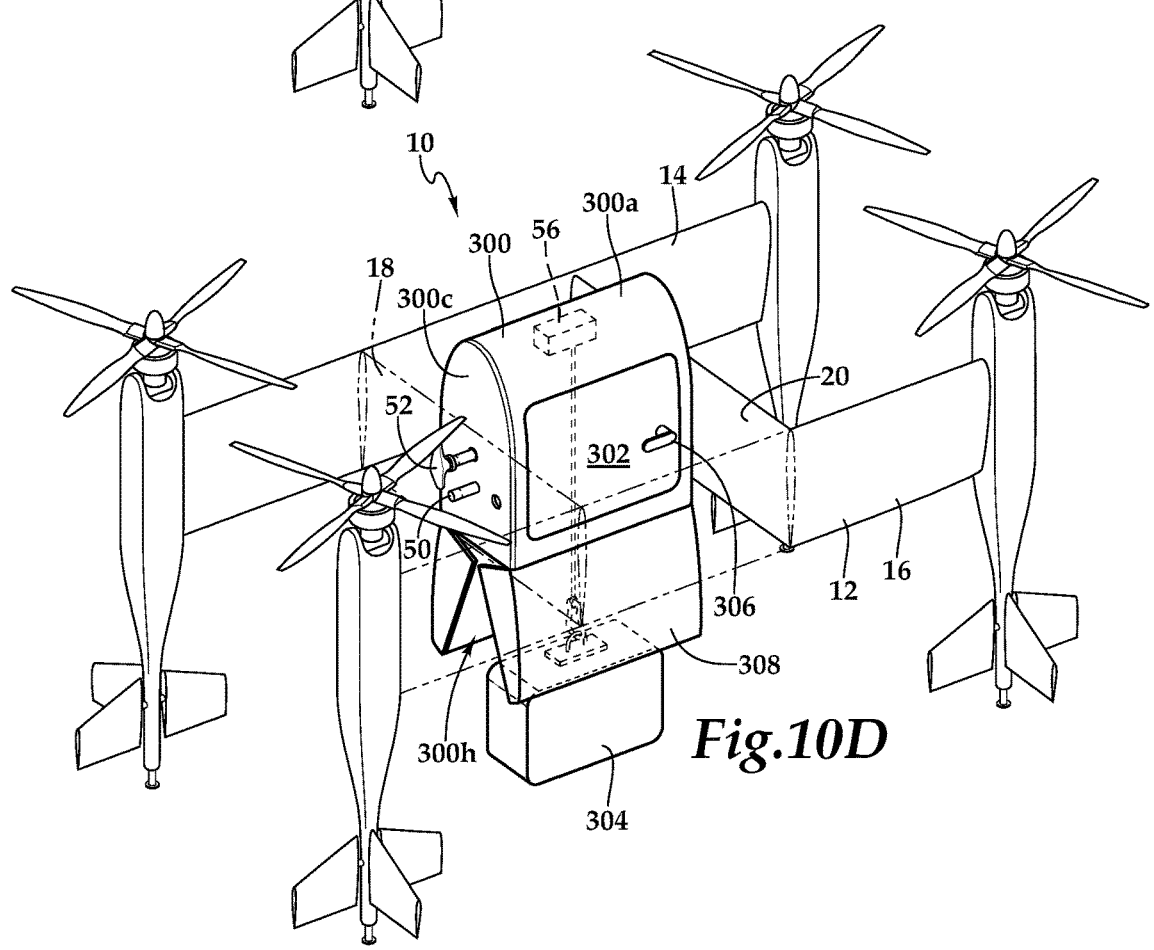

As discussed herein, aircraft 10 may autonomously fly to and land in a tailsitter orientation at the desired location for payload deployment responsive to commands from flight control system 30. Once aircraft 10 has landed at the desired location, payload 304 may be released from the cargo pod 300. This may be accomplished by opening an aft hatch depicted as clamshell doors 308 to expose aft opening 300h. Thereafter, cable system 56 may be used to control the descent of payload 304 to the ground, as discussed herein and as best seen in FIG. 10D.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft operable to transition between thrust-borne lift in a VTOL orientation and wing-borne lift in a biplane orientation, the aircraft comprising:
    an airframe including first and second wings with first and second pylons coupled therebetween;
    a distributed thrust array coupled to the airframe, the thrust array including a plurality of propulsion assemblies coupled to the first wing and a plurality of propulsion assemblies coupled to the second wing;
    a cargo pod coupled between the first and second pylons, the cargo pod rotatable between a loading configuration substantially perpendicular to the wings and a transportation and deployment configuration substantially parallel to the wings; and
    a flight control system configured to independently control each of the propulsion assemblies and autonomously deploy a payload from the cargo pod at a desired location;
    wherein, in the loading configuration, the cargo pod is adapted to receive the payload through a substantially horizontally oriented front opening located in an upper portion of the cargo pod; and
    wherein, in the transportation and deployment configuration, the cargo pod is adapted to deploy the payload through a substantially horizontally oriented aft opening located in a lower portion of the cargo pod.

2. The aircraft as recited in claim 1 wherein the cargo pod has an aerodynamic outer shape.

3. The aircraft as recited in claim 1 wherein the cargo pod further comprises a cargo enclosure having a front hatch operable to cover and uncover the front opening and an aft hatch operable to cover and uncover the aft opening.

4. The aircraft as recited in claim 1 wherein the cargo pod further comprises an open air cargo pod wherein the front opening and the aft opening remain uncovered.

5. The aircraft as recited in claim 1 wherein the front opening and the aft opening are substantially normal to one another.

6. The aircraft as recited in claim 1 wherein the front opening and the aft opening intersect.

7. The aircraft as recited in claim 1 wherein the cargo pod further comprises a payload support assembly that secures the payload in the cargo pod for transportation.

8. The aircraft as recited in claim 7 wherein the payload support assembly further comprises a lock system.

9. The aircraft as recited in claim 7 wherein the payload support assembly further comprises a gate system.

10. The aircraft as recited in claim 7 wherein the payload support assembly includes a variable payload cavity configurable based upon the size of the payload.

11. The aircraft as recited in claim 1 wherein the cargo pod further comprises a payload deployment assembly configured to release the payload from the cargo pod responsive to the flight control system.

12. The aircraft as recited in claim 11 wherein the payload deployment assembly further comprises a rail system.

13. The aircraft as recited in claim 11 wherein the payload deployment assembly further comprises a cable system.

14. The aircraft as recited in claim 13 wherein the cable system further comprises a retractable cable system.

15. The aircraft as recited in claim 13 wherein the cable system assembly further comprises an expendable cable system.

16. The aircraft as recited in claim 11 wherein the payload deployment assembly further comprises a payload self-orienting system.

17. The aircraft as recited in claim 11 wherein the payload deployment assembly further comprises a gate system.

18. The aircraft as recited in claim 1 wherein the flight control system is configured to autonomously deploy the payload from the cargo pod at the desired location when the aircraft is positioned on a surface in a tailsitter orientation.

19. An aircraft operable to transition between thrust-borne lift in a VTOL orientation and wing-borne lift in a biplane orientation, the aircraft comprising:
    an airframe including first and second pylons coupled therebetween;
    a distributed thrust array coupled to the airframe, the thrust array including a plurality of propulsion assemblies coupled to the first wing and a plurality of propulsion assemblies coupled to the second wing;

a cargo pod coupled between the first and second pylons, the cargo pod rotatable between a loading configuration substantially perpendicular to the wings and a transportation and deployment configuration substantially parallel to the wings; and a flight control system configured to independently control each of the propulsion assemblies and autonomously deploy a payload from the cargo pod at a desired location;

wherein, the cargo pod has a payload support assembly and a payload deployment assembly, the payload support assembly including a rail system having first and second rails respectively disposed on inner portions of first and second sides of the cargo pod configured to receive the payload, and a cable system disposed on an inner portion of a forward end of the cargo pod, the cable system including a cable configured to couple with the payload and retract the payload toward the forward end of the cargo pod to the secure the payload in the cargo pod, the payload deployment assembly configured to extend the cable such that the payload travels along the rails toward an aft end of the cargo pod, exits the aft end of the cargo pod and rotates approximately ninety degrees to self-orient, and to release the payload responsive to the flight control system.

20. An aircraft operable to transition between thrust-borne lift in a VTOL orientation and wing-borne lift in a biplane orientation, the aircraft comprising:

an airframe including first and second wings with first and second pylons coupled therebetween;

a distributed thrust array coupled to the airframe, the thrust array including a plurality of propulsion assemblies coupled to the first wing and a plurality of propulsion assemblies coupled to the second wing;

a cargo pod coupled between the first and second pylons, the cargo pod rotatable between a loading configuration substantially perpendicular to the wings and a transportation and deployment configuration substantially parallel to the wings; and a flight control system configured to independently control each of the propulsion assemblies and autonomously deploy a payload from the cargo pod at a desired location;

wherein, the cargo pod has a payload support assembly and a payload deployment assembly, the payload support assembly including a rail system having first and second rails respectively disposed on inner portions of first and second sides of the cargo pod and a gate system extending spanwise between the first and second rails, the gate system slidably positionable and lockable relative to the rail system to define a variable payload cavity configurable based upon the size of the payload and configured to the secure the payload in the cargo pod, the payload deployment assembly configured to pivotably operate a gate of the gate system from a closed position and an open position to release the payload from the cargo pod responsive to the flight control system.

* * * * *